US012436981B2

(12) United States Patent
Sawarkar

(10) Patent No.: US 12,436,981 B2
(45) Date of Patent: Oct. 7, 2025

(54) TRANSMFORMING TABLE-TO-TEXT USING AGGLOMERATIVE CLUSTERING

(71) Applicant: INTERNATIONAL BUSINESS MACHINES CORPORATION, Armonk, NY (US)

(72) Inventor: Kunal Sawarkar, Franklin Park, NJ (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 18/065,621

(22) Filed: Dec. 13, 2022

(65) Prior Publication Data

US 2024/0193191 A1 Jun. 13, 2024

(51) Int. Cl.
*G06F 16/334* (2025.01)
*G06F 40/10* (2020.01)
*G06N 20/00* (2019.01)

(52) U.S. Cl.
CPC .......... *G06F 16/3344* (2019.01); *G06F 40/10* (2020.01); *G06N 20/00* (2019.01)

(58) Field of Classification Search
CPC ...... G06F 16/3344; G06F 40/10; G06N 20/00
See application file for complete search history.

(56) References Cited

U.S. PATENT DOCUMENTS

| | | | |
|---|---|---|---|
| 9,336,772 B1 * | 5/2016 | Salvador | ............... G10L 15/183 |
| 9,817,919 B2 | 11/2017 | Aila et al. | |
| 10,162,878 B2 | 12/2018 | Nuchia et al. | |
| 10,552,129 B2 | 2/2020 | Salgado et al. | |
| 11,010,545 B2 | 5/2021 | Guggilla et al. | |
| 11,182,806 B1 | 11/2021 | Arfa et al. | |
| 11,301,639 B2 | 4/2022 | Jalali et al. | |
| 11,386,145 B2 | 7/2022 | Singh | |
| 11,886,827 B1 * | 1/2024 | Margolin | ................ G06F 40/40 |
| 2013/0185050 A1 * | 7/2013 | Bird | .................... G06F 16/3329 |
| | | | 704/E11.001 |
| 2017/0235820 A1 | 8/2017 | Conrad et al. | |
| 2020/0250212 A1 | 8/2020 | Macartney et al. | |
| 2020/0273453 A1 | 8/2020 | Mody et al. | |
| 2021/0124724 A1 * | 4/2021 | Bordawekar | ....... G06F 16/2237 |

(Continued)

OTHER PUBLICATIONS

Rebuffel, Clement, et al. "A hierarchical model for data-to-text generation." Advances in Information Retrieval: 42nd European Conference on IR Research, ECIR 2020, Lisbon, Portugal, Apr. 14-17, 2020, Proceedings, Part I 42. Springer International Publishing, 2020. (Year: 2020).*

(Continued)

*Primary Examiner* — Brian L Albertalli
(74) *Attorney, Agent, or Firm* — CHIP LAW GROUP

(57) ABSTRACT

A method and system of generating inferential text are provided. The method includes ingesting a data set that includes at least one structured hierarchical or multidimensional table for a particular domain. The method includes processing the ingested data set that includes the at least one structured hierarchical or multidimensional table for the particular domain by applying a generated machine learning model. The method includes generating inferential natural language text based on applying the machine learning model. The method includes outputting the generated inferential natural language text in a sequence format.

17 Claims, 13 Drawing Sheets

(56) References Cited

U.S. PATENT DOCUMENTS

| | | | |
|---|---|---|---|
| 2021/0311937 A1* | 10/2021 | Bordawekar | G06N 3/088 |
| 2021/0342447 A1 | 11/2021 | Sanzgiri et al. | |
| 2021/0349929 A1 | 11/2021 | Seledkin et al. | |
| 2022/0044134 A1* | 2/2022 | Joy | G06N 3/045 |
| 2022/0179896 A1 | 6/2022 | Farrell et al. | |

OTHER PUBLICATIONS

Bao, Junwei, et al. "Table-to-text: Describing table region with natural language." Proceedings of the AAAI conference on artificial intelligence. vol. 32. No. 1. 2018. (Year: 2018).*

Liu, Tianyu, et al. "Hierarchical encoder with auxiliary supervision for neural table-to-text generation: Learning better representation for tables." Proceedings of the AAAI Conference on Artificial Intelligence. vol. 33. No. 01. 2019. (Year: 2019).*

Gong, Heng, et al. "Table-to-text generation with effective hierarchical encoder on three dimensions (row, column and time)." arXiv preprint arXiv:1909.02304 (2019). (Year: 2019).*

Gong, Heng, et al. "Table-to-text generation via row-aware hierarchical encoder." Chinese Computational Linguistics: 18th China National Conference, CCL 2019, Kunming, China, Oct. 18-20, 2019, Proceedings 18. Springer International Publishing, 2019. (Year: 2019).*

Moosavi, Nafise Sadat, et al. "Scigen: a dataset for reasoning-aware text generation from scientific tables." Thirty-fifth Conference on Neural Information Processing Systems Datasets and Benchmarks Track (Round 2). 2021. (Year: 2021).*

Yang, Yang, et al. "Table to text generation with accurate content copying." Scientific reports 11.1 (2021): 22750. (Year: 2021).*

Gao, L. L. et al., "Selective Inference for Hierarchical Clustering", arXiv:2012.02936v2 [stat.ME] (2021), 55 pgs.

Sun, K. et al., "Tabular Functional Block Detection with Embedding-based Agglomerative Cell Clustering"; CIKM (2021); 10 pgs.

Bodrunova, S.S. et al., "Topic Detection Based on Sentence Embeddings and Agglomerative Clustering with Markov Moment"; Future Internet (2020); vol. 12:144, 17 pgs.

Ah-Pine, J. "An Efficient and Effective Generic Agglomerative Hierarchical Clustering Approach"; Journal of Machine Learning Research (2018), 43 pgs.

Bailoni, A., et al., "GASP, A Generalized Framework for Agglomerative Clustering of Signed Graphs and its Application to Instance Segmentation"; arXiv:1906.11713v2 [cs.CV] (2022); 20pgs.

Chen, S. et al., "A General Model for Neural Text Generation from Structured Data"; School of Computer Science and Technology, Harbin Institute of Technology, Harbin, China (Date unknown).

Bao, J. et al., "Text Generation From Tables"; IEEE/ACM Transactions on Audio, Speech, and Language Processing (2019); Vo. 27:2, p. 311.

Alsuhaibani, M. et al., "Joint Learning of Hierarchical Word Embeddings from a Corpus and a Taxonomy"; Automated Knowledge Base Construction (2019), 18 pgs.

Al, Q. et al., "Learning a Hierarchical Embedding Model for Personalized Product Search"; SIGIR (2017); 10 pgs.

Lebret, R., et al., "Neural Text Generation from Structured Data with Application to the Biography Domain"; Proceedings of the 2016 Conference on Empirical Methods in Natural Language Processing (2016); pp. 1203-1213.

Liu, T. et al., "Table-to-text Generation by Structure-aware Seq2seq Learning", arXiv:1711.09724v1 [cs.CL] (2017); 8 pgs.

Govindaraju, V. et al., "Understanding Tables in Context Using Standard NLP Toolkits"; Proceedings of the 51st Annual Meeting of the Association for Computational Linguistics (ACL—2013); 7 pgs.

Krishnamurthy, J. et al., "Neural Semantic Parsing with Type Constraints for Semi-Structured Tables"; Allen Institute for Artificial Intelligence, 11 pgs. (Date unknown).

Bordawekar et al, "Exploiting Latent Information in Relational Databases via Word Embedding and Application to Degrees of Disclosure", CIDR, 2019, 6 pages.

Deng et a., "Table2Vec: NeuralWord and Entity Embeddings for Table Population and Retrieval", arXiv, May 31, 2019, 4 pages.

Rong, "word2vec Parameter Learning Explained", arXiv, Jun. 5, 2016, 21 pages.

* cited by examiner

| PRIMARY OUTCOME | STANDARD (N=189) | FRESH (N=188) | RISK RATIO (95% CONFIDENCE INTERVAL) |
|---|---|---|---|
| ILLNESS 1 | 63 (33.3) | 60 (31.9) | 0.96 (0.72 TO 1.28) |
| ILLNESS 2 | 31 (16.4) | 30 (16.0) | 0.97 (0.61 to 1.54) |
| COMPOSITE PRIMARY | 100 (52.9) | 99 (52.7) | 1.00 (0.82 to 1.21) |

FIG. 4

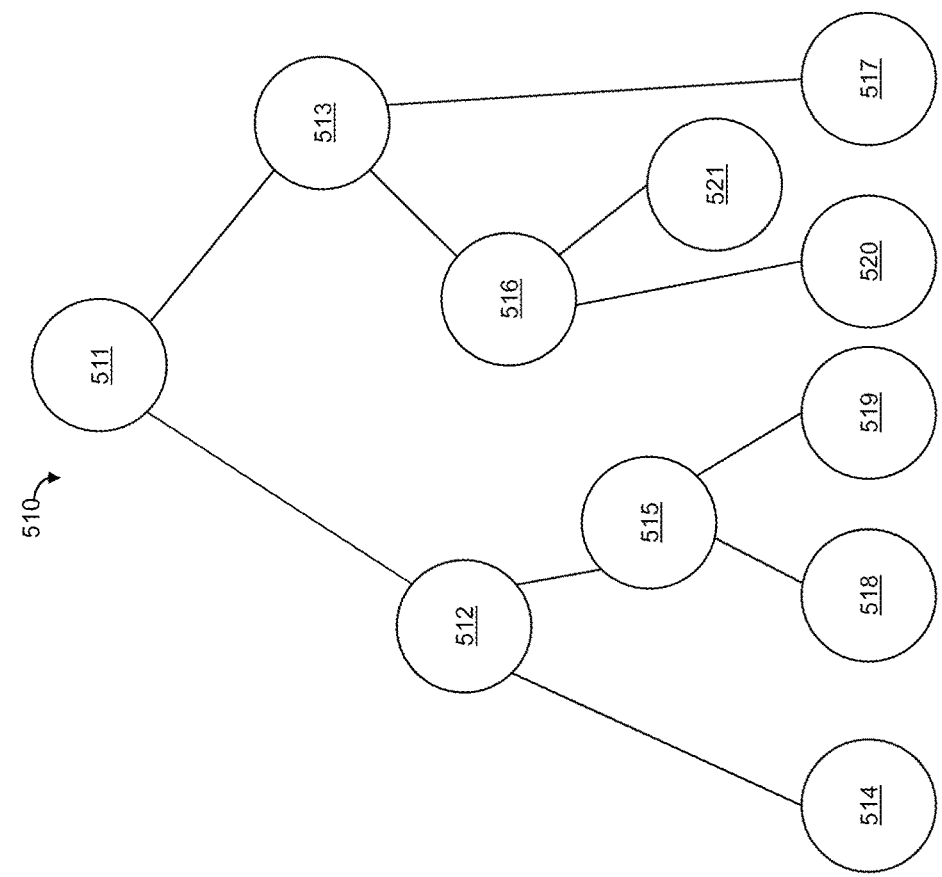
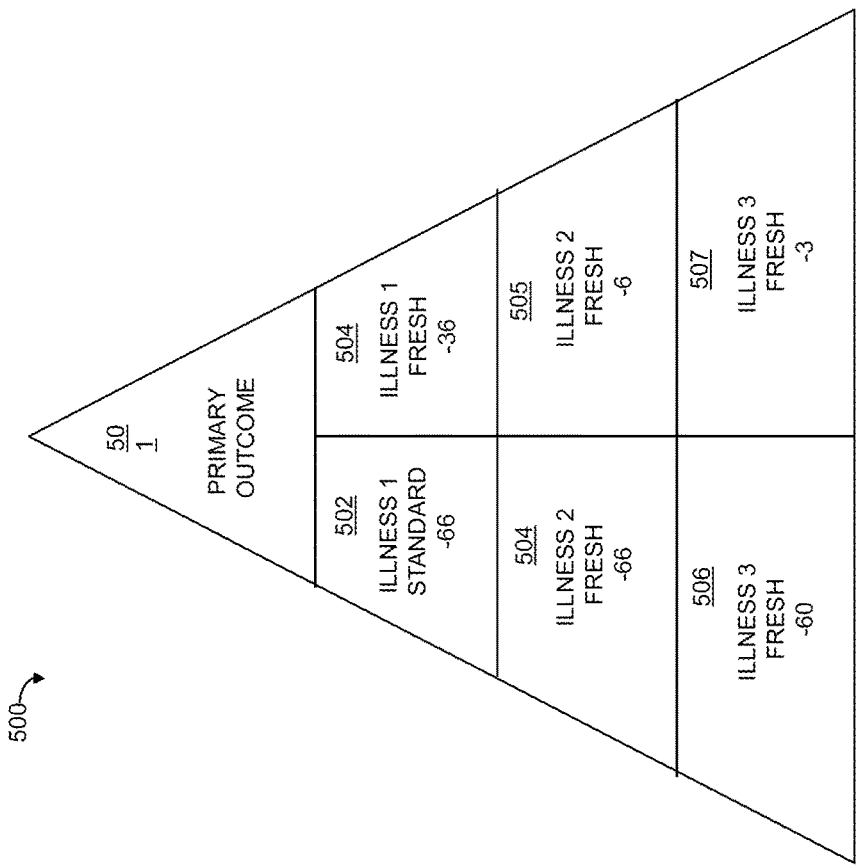
FIG. 5B
FIG. 5A

TRANSMFORMING TABLE-TO-TEXT USING AGGLOMERATIVE CLUSTERING

BACKGROUND

Technical Field

The present disclosure generally relates to data processing, and more particularly, to systems and methods of machine learning techniques.

Description of the Related Art

Machine learning is a subfield of artificial intelligence directed to training a computer system to learn relationships between disparate data sources. Through training, a computer system may gradually improve relationship identification. Another subfield of artificial intelligence is neural networks, which uses statistical methods to make classifications or predictions based on data sets. A neural network may comprise an input layer, at least one hidden layer, and an output layer. Each node of each layer connects to another node and may have an associated weight or threshold.

SUMMARY

According to an embodiment of the present disclosure, a method of generating inferential text based on at least one structured table is provided. The method includes a computing system ingesting a data set that includes at least one structured table for a particular domain. The computing system processes the ingested data set that includes the at least one structured table for the particular domain by applying a generated machine learning model. The computing system generates inferential natural language text based on applying the generated machine learning model. The computing system outputs the generated inferential natural language text in a sequence format.

By virtue of the teachings herein, a method that includes a computing system generating a machine learning model and based on implementing machine learning techniques, including neural networks and agglomerative clustering, to ingest baseline data including experimental results (e.g., in the form of a unidimensional table or a multidimensional table), expressed by qualitative and quantitative data, to generate text articulating the baseline data according to an approved format, will greatly reduce computing resources, including memory allocation, processing power usage, as well as improve accuracy and representation of baseline data in the form of a final publication.

Moreover, using currently known methods of processing complex data structures (e.g., such as a multidimensional table) using known machine learning techniques can be problematic, e.g., resource intensive, including requiring high processing power, memory allocation, and the like, if possible, at all. However, using technical aspects of the present disclosure discussed in the Detailed Description, that incorporate agglomerative clustering to process relational tables obviates the need for manual data collection and processing, and allows a streamlined approach for quick publication generation accessible by remotely located user devices. Further, the machine learned techniques are subject to periodic training using historical baseline data, which can identify trends within the baseline data with quick referencing.

In one embodiment, the computing system may generate the machine learning model by assigning a row identifier and unique token for each row of the at least one structured table. Generating the machine learning model may further include the computing system converting each row of the at least one structured table into a sentence with the assigned row identifier and unique token. Generating the machine learning model may further include the computing system using agglomerative clustering techniques to map the at least one structured table and an associated hierarchical structure. Generating the machine learning model may further include the computing system determining based on mapping the at least one structured table and the associated hierarchical structure, context for each row of the at least one structured table. Generating the machine learning model may further include the computing system determining, based on the determined context for each row of the at least one structured table, a relationship between each row of the at least one structured table.

In one embodiment, the computing system determining the relationship between each row further includes using a recurrent neural network based on semi-supervised model or a sequence model.

In one embodiment, the computing system determining the relationship between each row further comprises using a deep neural network natural language generation model as a pyramid function.

In one embodiment, the computing system further inputs the generated inferential text to a feedback loop configured to compare the generated inferential text to historically generated inferential text.

In one embodiment, the computing system determining a relationship between each row further includes inputting each unique token to a neural network. The neural network includes an input layer, at least one hidden layer, and an output layer. The output layer is a SoftMax function.

According to an embodiment, a system for generating text based on ingesting at least one structured table includes a computing system having one or more processors, one or more computer-readable memories, one or more non-transitory computer-readable storage devices, and program instructions stored on at least one of the one or more non-transitory storage devices for execution by at least one of the one or more processors via at least one of the one or more memories. The computing system is capable of performing a method that includes the computing system ingesting a data set that includes at least one structured table for a particular domain. The computing system processes the ingested data set that includes the at least one structured table for the particular domain by applying a generated machine learning model. The computing system generates inferential natural language text based on applying the generated machine learning model. The computing system outputs the generated inferential natural language text in a sequence format.

By virtue of the teachings herein, generating a machine learning model by implementing machine learning techniques, including neural networks and agglomerative clustering, to apply to ingested baseline data including experimental results (e.g., in the form of a unidimensional table or a multidimensional table), expressed by qualitative and quantitative data, to generate text articulating the baseline data according to an approved format, will greatly reduce computing resources, including memory allocation, processing power usage, as well as improve accuracy and representation of baseline data in the form of a final publication.

Moreover, using currently known methods of processing complex data structures (e.g., such as a multidimensional table) using known machine learning techniques can be problematic, e.g., resource intensive, including requiring high processing power, memory allocation, and the like, if possible, at all. However, using technical aspects of the present disclosure discussed in the Detailed Description, that incorporate agglomerative clustering to process relational tables obviates the need for manual data collection and processing, and allows a streamlined approach for quick publication generation accessible by remotely located user devices. Further, the machine learned techniques are subject to periodic training using historical baseline data, which can identify trends within the baseline data with quick referencing.

In one embodiment, generating the machine learning model may include assigning a row identifier and unique token for each row of the at least one structured table. Processing may further include converting each row of the at least one structured table into a sentence with the assigned row identifier and unique token. Generating the machine learning model may further include using agglomerative clustering techniques to map the at least one structured table and an associated hierarchical structure. Generating the machine learning model may further include determining based on mapping the at least one structured table and the associated hierarchical structure, context for each row of the at least one structured table. Generating the machine learning model may further include determining, based on the determined context for each row of the at least one structured table, a relationship between each row of the at least one structured table.

In one embodiment, determining the relationship between each row further includes using a recurrent neural network based on semi-supervised model or a sequence model.

In one embodiment, determining the relationship between each row further includes using a deep neural network natural language generation model as a pyramid function.

In embodiment, the method further includes inputting the generated inferential text to a feedback loop configured to compare the generated inferential text to historically generated inferential text.

In one embodiment, determining a relationship between each row further includes inputting each unique token to a neural network, wherein the neural network includes an input layer, at least one hidden layer, and an output layer, wherein the output layer is a SoftMax function.

According to an embodiment of the present disclosure, a computer program product includes one or more non-transitory computer-readable storage devices and program instructions stored on at least one of the one or more non-transitory storage devices. The program instructions are executable by a processor, the program instructions including instructions to ingest a data set that includes at least one structured table for a particular domain. The program instructions include further instructions to process the ingested data set that includes the at least one structured table for the particular domain by applying a generated machine learning model. The program instructions further include instructions to generate inferential natural language text based applying the generated machine learning model. The program instructions further include instructions to output the generated inferential natural language text in a sequence format.

By virtue of the teachings herein, generating a machine learned model by implementing machine learning techniques, including neural networks and agglomerative clustering, to ingest baseline data including experimental results (e.g., in the form of a unidimensional table or a multidimensional table), expressed by qualitative and quantitative data, to generate text articulating the baseline data according to an approved format, will greatly reduce computing resources, including memory allocation, processing power usage, as well as improve accuracy and representation of baseline data in the form of a final publication.

Moreover, using currently known methods of processing complex data structures (e.g., such as a multidimensional table) using known machine learning techniques can be problematic, e.g., resource intensive, including requiring high processing power, memory allocation, and the like, if possible, at all. However, using technical aspects of the present disclosure discussed in the Detailed Description, that incorporate agglomerative clustering to process relational tables obviates the need for manual data collection and processing, and allows a streamlined approach for quick publication generation accessible by remotely located user devices. Further, the machine learned techniques are subject to periodic training using historical baseline data, which can identify trends within the baseline data with quick referencing.

In one embodiment, generating the machine learning model may include assigning a row identifier and unique token for each row of the at least one structured table. Each row of the at least one structured table is converted into a sentence with the assigned row identifier and unique token. Agglomerative clustering techniques are used to map the at least one structured table and an associated hierarchical structure. Based on mapping the at least one structured table and the associated hierarchical structure, context is determined for each row of the at least one structured table. Based on the determined context for each row of the at least one structured table, a relationship is determined between each row of the at least one structured table.

In one embodiment, determining the relationship between each row further includes using a recurrent neural network based on semi-supervised model or a sequence model.

In one embodiment, determining the relationship between each row further includes using a deep neural network natural language generation model as a pyramid function.

In one embodiment, the program instructions include further instructions to input the generated inferential text to a feedback loop configured to compare the generated inferential text to historically generated inferential text.

In one embodiment, determining a relationship between each row further includes inputting each unique token to a neural network. The neural network includes an input layer, at least one hidden layer, and an output layer. The output layer is a SoftMax function.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 4 is a diagram illustrating a relational table including baseline data, consistent with an illustrative embodiment.

FIG. 5A is a diagram illustrating a pyramid embedding model of the relational table of FIG. 4, consistent with an illustrative embodiment.

FIG. 5B is a diagram of a hierarchical divisive clustering model including a plurality of child nodes and parent nodes, consistent with an illustrative embodiment.

DETAILED DESCRIPTION

Overview

Figure 1:
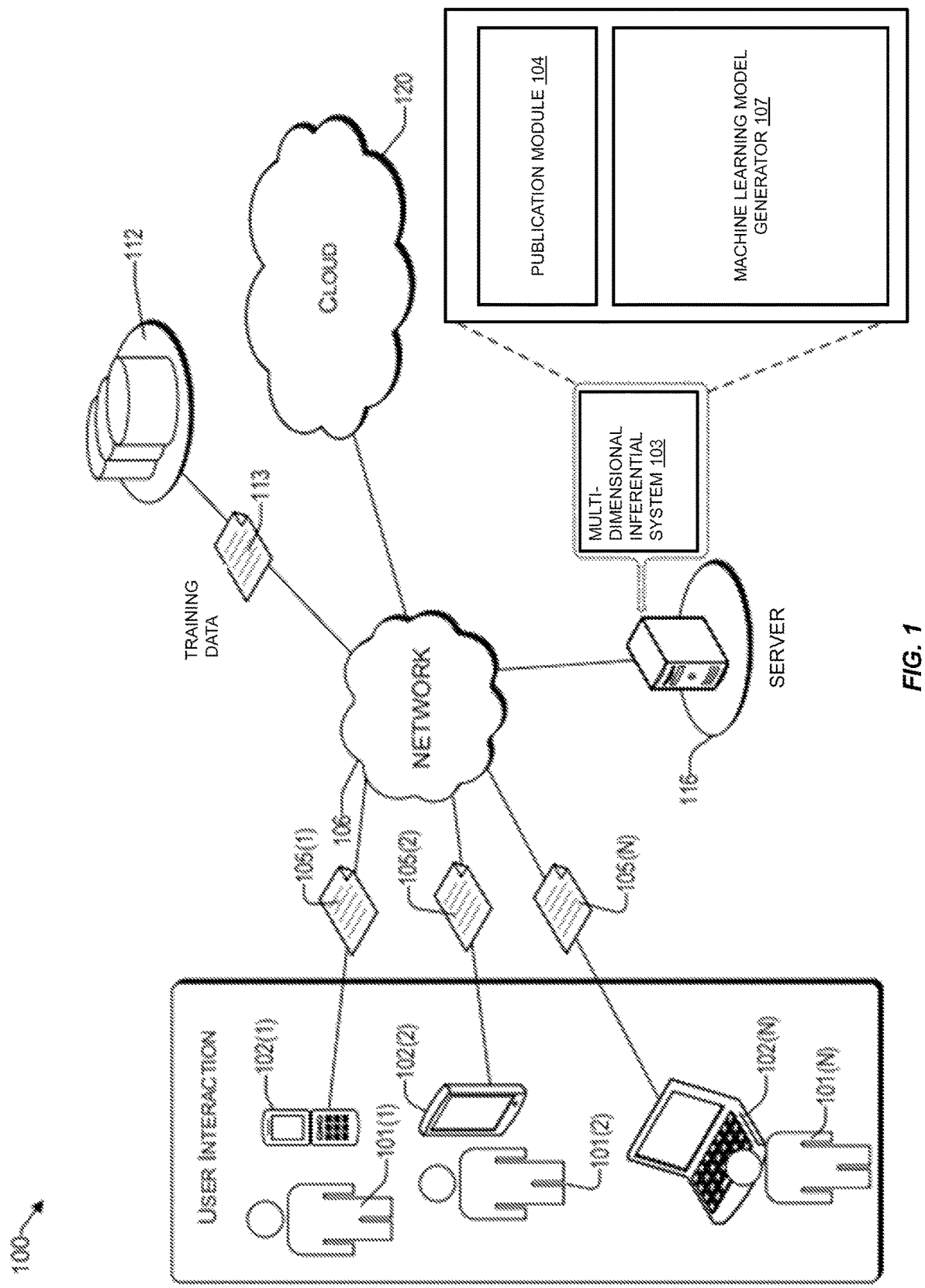
FIG. 1 is an example architecture of a system for generating inferential text using machine learning techniques, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods of generating text (e.g., in the form of a publication) based on using machine learning techniques that ingest baseline data (e.g., data collected from a clinical study, an audit such as a tax or business audit, and so on). Technical aspects of the present disclosure can be applicable to ingesting baseline data, in the form of a structured or unstructured table, which may be a multidimensional table (hereinafter, multidimensional table is used throughout the Detailed Description; however, technical aspects apply to, and incorporate, any dimensional tables, including but not limited to structured and unstructured tables a unidimensional table or multidimensional tables, such as two dimensional tables, three dimensional tables, and so on), such as a multidimensional table that includes any type of information such as from a tax audit, a scientific experiment, a clinical study, and so on. However, for brevity, the discussion of the technical aspects has been focused on using a clinical study as an example of how the technical aspects can be used in practice. This does not in any way limit the technical aspects of the present disclosure to a clinical study.

Conducting a study (such as a clinical study) is an exercise that includes well-defined protocols, standards, and guidelines, that are largely governed by regulatory bodies like the Food and Drug Administration (FDA), the Center for Disease Control and Prevention (CDC), and the like. The results of clinical studies are typically published in a journal accompanied by baseline data to support the analysis and outcomes derived the publication (hereinafter, the terms "report" and "publication" may be used interchangeably). The publication generally follows a standardized format like consolidated standards or reporting trials (CONSORT), which is a widely used clinical trial reporting format to ensure transparency and consistency.

For a researcher drafting a clinical trial report, the researcher is generally required to collect baseline data (e.g., quantitative and qualitative data) for a particular study, perform statistical analysis on the baseline data, analyze the baseline data, such as numerical data and qualitative data represented in the form of a structured or unstructured table (e.g., a multidimensional table), and conform the baseline data to the requirements of a standard, such as required by CONSORT. These operations may be further supplemented by statistical techniques used on the baseline data.

The next leg of a researcher's job is articulating the baseline data in a publication (e.g., in a natural language format that a reader can easily comprehend), which may be highly regulated in terms of word limit. The researcher may be required to write objective, study-setting outcomes, based on the baseline data and draw correct results based on one or more methodologies. For example, a clinical trial report (or a tax audit report, a business audit report, a scientific study publication, and so on) may conform to the following structure: natural language text precedes and articulates the supported baseline data, e.g., that is represented in the form of various tables (e.g., multidimensional tables).

Drafting such a clinical trial report may include baseline data retrieval (e.g., from a table format), to structure the baseline data in a text format. There are other aspects of text generation in a clinical trial report that are commonplace industry knowledge. For example, with baseline data that includes a probability that does not satisfy a confidence threshold, text can be generated that reads an outcome of the study as failing to reject a hypothesis based on the confidence threshold not being satisfied. Such nontrivial text generation is also highly rule driven yet context specific.

Given the scenario that a majority of text generated for a clinical trial publication (or a tax audit publication, a business audit publication, a scientific study publication, and so on) is an inference and/or summary accoupling tables, derived from baseline data, one can argue that much of productive time of researchers can be wasted in writing that content.

A clinical trial publication can be seen as a system of information resulting from parsing and knowledge extraction of baseline data. The information can be derived from the baseline data included within supporting tables (e.g., multidimensional tables) that may provide a first set of inputs for writing and objectives of study, and a domain of study may be a second set of input in terms context of report. Although this process is largely analytical and based on strict guidelines (e.g., CONSORT), it is only done manually.

The table structure (e.g., a multidimensional table) for a clinical trial report is a complex structure with multiple rows and multiple columns and requires a multidimensional inferential system, so that the table can be converted to a series of sentences, that can then be arranged as a logical sequence of order. Current methods in the art for sentence generation are not adequate for performing such tasks.

Advantageously, technical aspects of the present disclosure propose a system and method for generating inferential natural language text and summaries from structured or unstructured tables (e.g., a multidimensional table) for a domain of, e.g., a clinical trial report, a tax audit report, a business audit report, a scientific study publication, and so on. Technical aspects of the present disclosure include a machine learning algorithm (e.g., deep neural network, 3-layer neural network including a SoftMax function, and the like) that can understand baseline data represented, for example, in the form of a table (e.g., a multidimensional table) and convert it into a machine-readable format to generate inferential natural language text according to a predetermined criterion (e.g., CONSORT).

Technical aspects of the present disclosure may include the following: first, a computing system receives a multidimensional table that is represented in the form of a series of logical blocks that follows a domain specific hierarchy (e.g., a clinical trial for heart failure, a profit and loss statement, an audit report, and so on), representation, and interpretation logic. The computing system may be a module that will have a series of tasks associated with annotation of source tables and generating a set of business rules. The system annotates the source data columns for training purposes, including taxonomy specific to the domain. For example, a multidimensional table for a cardiovascular method may have annotations that describe the meaning of each column in the table, such as specific conditions related to cardiovascular disease and the associated data collected for each specific condition.

Second, the system may convert the multi-dimensional table to generate sentences in a sequential format for multidimensional complex table formats. The system includes machine learning techniques, such as an encoder-decoder mechanism (e.g., which may be included in the neural network, as discussed below) and an attention mechanism.

Technical aspects may perform the following method. First, invoked agglomerative embeddings capture the context of each row of the multidimensional table, as well as relationships between each row and adjacent rows. Second, structured query language (SQL) queries of each of the rows of the multidimensional table may be used as training input to a machine learning model, as discussed below, to learn relationships between the rows. Further, technical aspects of the present disclosure may assume that every touchpoint in a journal entry has data generated, captured, and assessed. This includes available options for each mode of analysis, blinding methods, sample size, outcomes, dropouts etc. This manual labeled dataset is salient for the initial training.

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language is to be read in its proper technological context, i.e., as concrete specifications for physical implementations.

Accordingly, one or more of the methodologies discussed herein may obviate a need for time consuming data processing by the user. Technical aspects of the present disclosure may have the technical effect of reducing computing resources used by one or more devices within the system. Examples of such computing resources include, without limitation, processor cycles, network traffic, memory usage, storage space, and power consumption.

Further, technical aspects of the present disclosure cannot be performed in the human mind or with paper and pen. For example, as discussed with reference to at least FIG. 1, the multi-dimensional inferential system 103 ingests baseline data, in the form of electronic data packages 105(1)-(N), from at least one electronic device 102(1)-(N) (which may be located remotely) over a network 106. For example, each of the users 102(1)-(N) may be research scientists located at various universities across the world. Moreover, the multidimensional inferential system 103 can simultaneously process each of the electronic data packages 105(1)-(N) to generate inferential text according to a particular guideline (such as the CONSORT guideline), generate a publication representing the baseline data, and transmit the generated publication to each of the electronic devices 102(1)-(N). The details of the multidimensional inferential system are discussed below, with reference to FIGS. 2-13.

Example Architecture

FIG. 1 illustrates an example architecture of a system for carrying out embodiments of the present disclosure. More specifically, FIG. 1 illustrates an example architecture 100 of a system for generating inferential text, consistent with an illustrative embodiment. Architecture 100 may include one or more users 101(1) to 101(N) who can interact individually or collaboratively with interactive multidimensional inferential system 103 stored, (e.g., on a server 116). Multidimensional inferential system 103, can receive baseline data (e.g., experimental data, tax or business audit data, clinical trial data, and so on, such as in the form of a multidimensional table), extract the baseline data using publication module 104, and generate natural language text using natural language processing (NLP) generation module 107.

Each user 101(1) to 101(N) can interact with the multidimensional inferential system 103 by way of sending and receiving electronic data packages 105(1) to 105(N) over a network 106. The electronic data packages 101(1) to 105(N) may include the baseline data, such as, without limitation, multidimensional tables that includes at least one column and at least one row. The multidimensional table may have varying dimensions, e.g., two dimensions, as illustrated and discussed below, three dimensions, four dimensions, and so on. The columns and rows may include qualitative data, such as in the form of natural language, or quantitative data, such as in the form of numerical data. For example, a column may be titled respiratory illness and each corresponding row may have a numerical input that indicates quantitatively the seriousness of the respiratory illness; a second column may be titled brain injury and have corresponding rows; and so on.

There is a network that 106 allows various user devices 102(1) to 102(N) to communicate with a data repository 112, server 116, and/or each other. Network 106 may be, without limitation, a local area network ("LAN"), a virtual private network ("VPN"), a cellular network, the Internet, or a combination thereof. For example, network 106 may include a mobile network that is communicatively coupled to a private network, sometimes referred to as an intranet, that provides various ancillary services, such as communication with various databases, the Internet, and cloud 120.

For discussion purposes, different user/electronic/computing devices (e.g., 102(1) to 102(N)) appear in the drawing, to represent some examples of the client devices that may be used by a user (e.g., 101(1) to 101(N)) to communicate over network 106. Today, user devices typically take the form of portable handsets, smart-phones, tablet computers, desktop computers, personal digital assistants (PDAs), and smart watches, although they may be implemented in other form factors, including consumer, medical, and business electronic devices.

Data repository 112 and/or server 116 is configured to store one or more algorithms including machine learning, natural language processing, neural networks, agglomerative clustering methods, and the like. Further, data repository may store training data 113. In some examples, training data 113 may include historical baseline data of previous electronic data packages 105(1)-105(N) and/or final publications (discussed below) generated by multi-dimensional inferential system 103, that data repository 112 and multidimensional inferential system 103 use to learn how to improve generation of inferential natural language text.

Server 116 may comprise a group of computing resources that hosts multidimensional inferential system 103. Multidimensional inferential system 103 may have two main modules for generating inferential natural language text for model document creation (e.g., a final publication consistent with guidelines outlined a specific format). There may be a publication module 104 that is operative to capture all electronic data packages (e.g., 105(1) to 105(N)) that may include baseline data represented as, e.g., a multidimensional table, as discussed below.

Multidimensional inferential system 103 may include an NLP generation module 202 that is operative to generate inferential text that may result in a final publication articulating the baseline data collected from electronic data package(s) 105(1)-(N) received by multidimensional inferential system 103. Multidimensional inferential system 103 may include additional modules as discussed in more detail with reference to FIGS. 2-13.

While data repository 112 and server 116 and computing devices 102(1)-102(N) are illustrated by way of example to be on different platforms, it will be understood that, in different embodiments, these platforms may be combined in different combinations. In other embodiments, one or more of these computing platforms may be implemented by virtual computing devices in the form of virtual machines or software containers that are hosted in the cloud 120, thereby providing an elastic architecture for processing and storage. The cloud is discussed in more detail later.

Example Architecture

Figure 2:
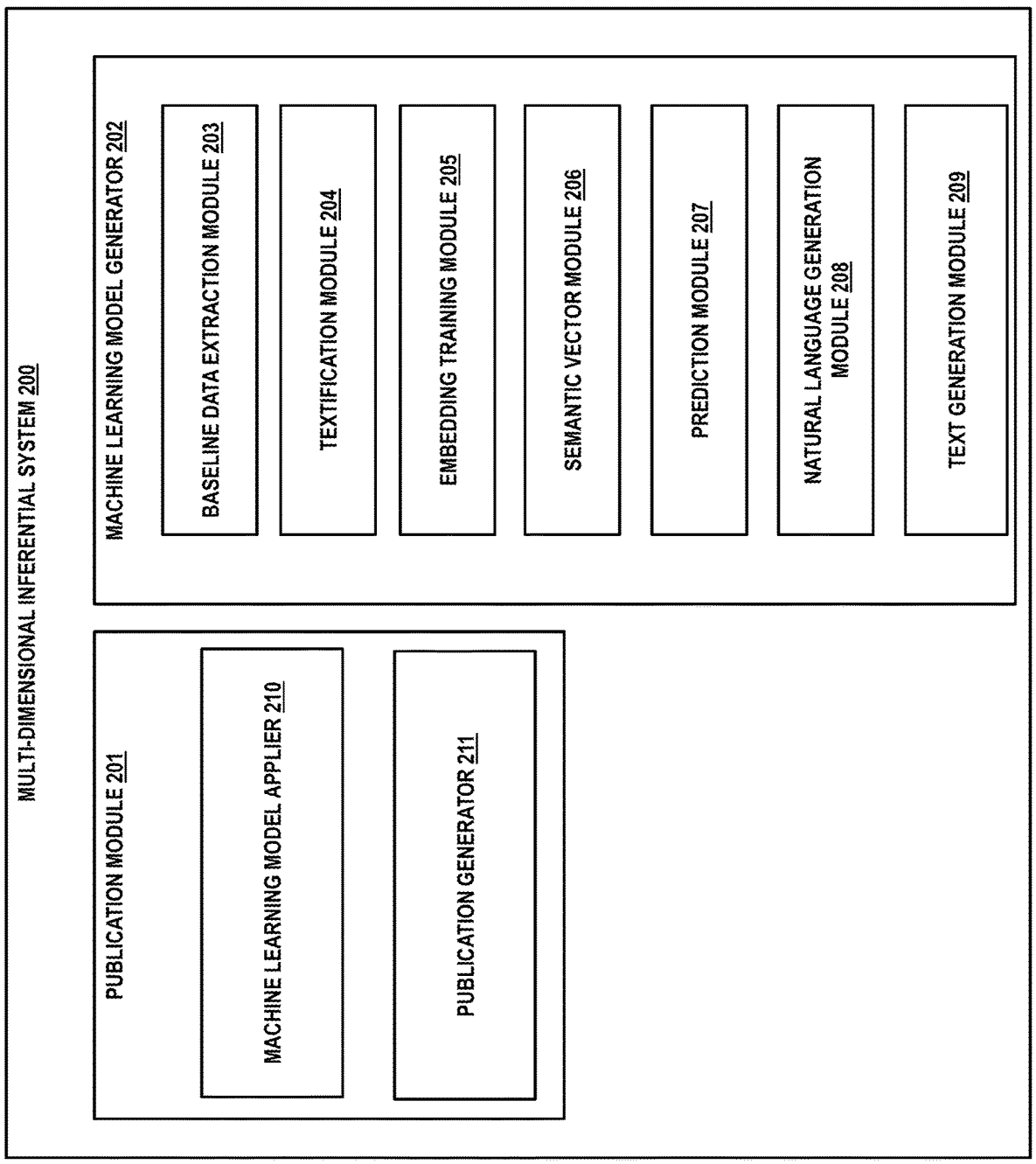
FIG. 2 is a block diagram illustrating a multidimensional inferential system, consistent with an illustrative embodiment.

FIG. 2 is a conceptual block diagram of a multidimensional inferential system 200 (e.g., the multidimensional inferential system 103 of FIG. 1) for receiving baseline data (e.g., experimental results such as scientific data, clinical trial data, tax or business audit data, and so on, and analysis in the form of a multidimensional table) and using machine learning techniques to generate a machine learning model that can be applied to a multidimensional table to generate inferential natural language text, resulting in a final publication (e.g., a clinical trial report), according to specific industry guidelines (such as CONSORT).

Multidimensional inferential system 200 includes a publication module 201 (e.g., the publication module 104 of FIG. 1) and a machine learning model generator 202 (e.g., the NLP generation module 105 of FIG. 1). Publication module 201 includes a machine learning model applier 210 and a publication generator 211. Publication module 201 may be operative to capture the baseline data in the form of a multidimensional table (e.g., from electronic devices 105 (1) to (N)). For example, baseline data extraction module may receive electronic data packages 105(1)-(N) from one or more users 101(1)-(N) using any of electronic devices 102(1)-(N). In some examples, the baseline data may be represented in the form of text, audio, image, or video data. In some examples, the multidimensional table may have at least one column and at least one row. Further, the multidimensional table may include qualitative data and quantitative data.

In some examples, one of users 101(1)-(N) may be communicatively coupled to server 116 and execute multidimensional inferential system 200, e.g., once user has collected sufficient baseline data (e.g., experimental data, audit data, clinical study data, and so on) for publication.

In some examples, publication generator 211 may output a final publication. In some examples, multidimensional inferential system 200 may transmit the final publication for display within any of electronic devices 102(1)-(N). In some examples, the final publication may be reviewed by a user (e.g., any of user(s) 101(1)-(N)) for accuracy and, if a user (e.g., 101(1)-(N)) is dissatisfied, may request multidimensional system 200 to reprocess the baseline data to generate an accurate publication with text that is reflective of the baseline data. In some examples, user 101(1) may include notes where the final publication is incorrect and how to correct such errors.

Machine learning model applier 210 may be operative to apply the machine learning model generated by machine learning model generator 202 on the baseline data received by publication module 201. Publication module 211 may be operative to output a final publication based on based in part on applying the machine learned model and according to a standard or set of guidelines (e.g., which may be manually set by a user or automatically set according to a governing standard, such as CONSORT).

The machine learning model generator 202 may include a baseline data extraction module 203, textification module 204, an embedding training module 205, a semantic vector module 206, a prediction module 207, a natural language generation module 208, and a text generation module 209. Each of the modules in machine learning model generator 202 may perform operations on training data (e.g., training data 113) and/or baseline data received by publication module 201. Machine learning model generator 202 may train periodically, e.g., once a minute, an hour, a day, when new training data is available, and so on. Machine learning model generator 202 may be operative to execute each module 203-209.

Baseline data extraction module 203 may be operative to clean a multidimensional table (e.g., remove redundant data), and map fields of the multidimensional table. For example, baseline data extraction module 201 may receive the baseline data, e.g., in the form of text, audio, image, or video data. Baseline data extraction module 203 may develop field mapping of the baseline data. Further, baseline data extraction module 203 may further develop input matrix mapping and build conversion specifications. Details of baseline data extraction module 201 are discussed below.

The textification module 204 may be operative to convert one or more rows of the multidimensional table into a structure comprising full sentences and assign a row identifier and unique token for each row. Further, textification module creates indexes for each row identifier and unique token. As discussed in more detail with reference to FIG. 5, textification module 204 may map each table (e.g., a unidimensional table or a multidimensional table) and its associated hierarchical structure using an agglomerative clustering method (e.g., agglomerative clustering methods commonly known in the art), which has different rows for each level of the cluster that are linked to each other by a parent-node relationship. The hierarchical clustering creates the rows with each identification of a node that can be traced back. The textification module 204 may further tokenize each row based on the row identifier and capture the context of neighbor rows.

Figure 7:
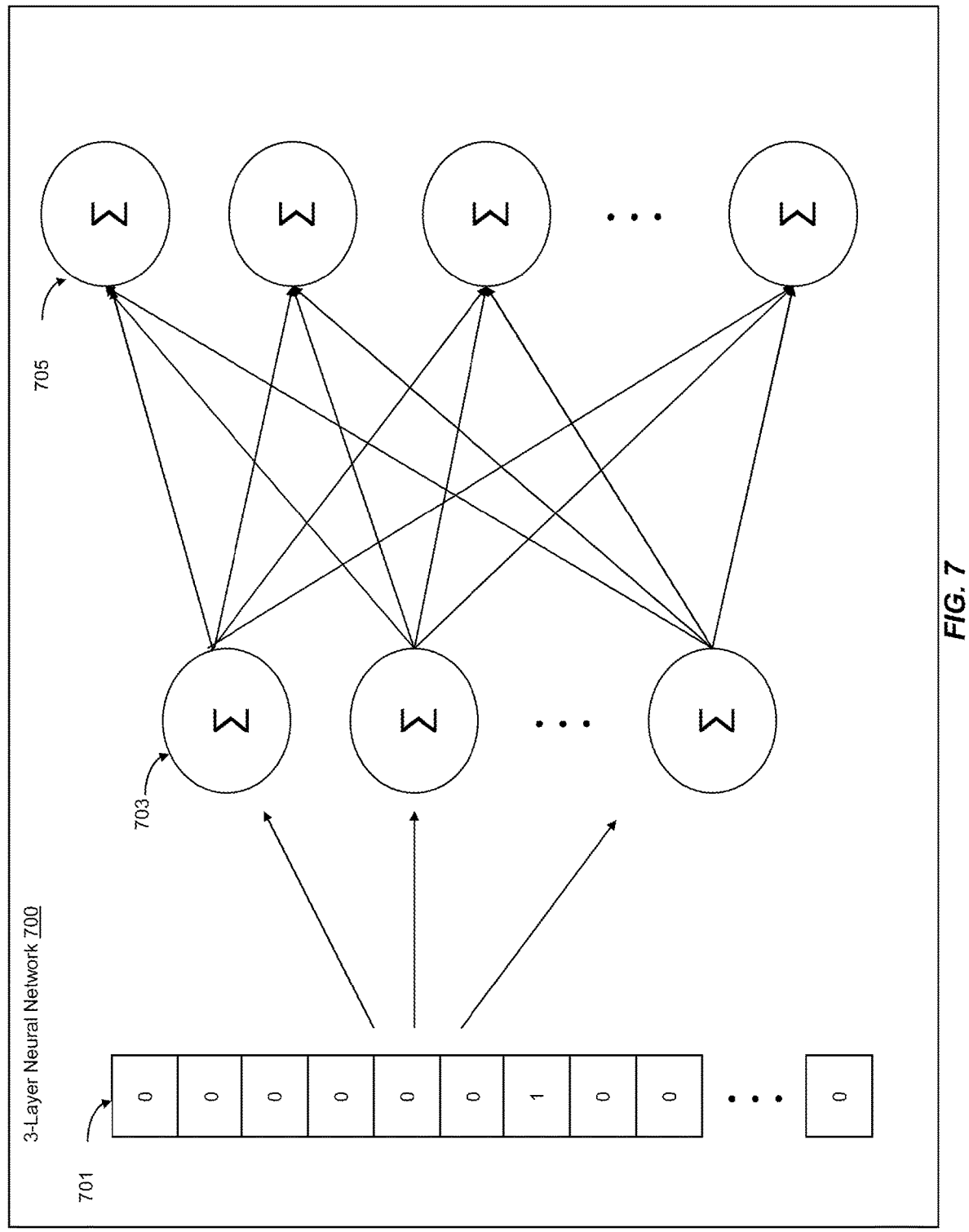
FIG. 7 is a block diagram illustrating an example neural network including at least one hidden layer, consistent with an illustrative embodiment.

Embedding training module 205 may be operative to execute a neural network (e.g., a 3-layer neural network, as discussed with reference to FIG. 7) to learn relationships between the unique tokens. Embedding training module 204 may input each of the tokens generated by textification module to, e.g., a neural network (e.g., neural network 700) to determine relationships between the rows that the unique tokens represent. In examples, embedding training module 205 may use training data (e.g., training data 113) to train the neural network.

Semantic vector module 206 may be operative to generate learned semantic vectors based on an output from the embedding training module 205. A semantic vector may be configured to represent quantitative or qualitative data (text) in terms of underlying concepts. The semantic vectors may match with other semantic vectors based on similarity of the underlying concepts of the semantic vectors. Prediction module 207 may be operative to use a similarity function (e.g., cosine similarity) or neighboring methods on the learned semantic vectors to predict text for generation that correctly articulates the baseline data or training data. Natural language generation module 208 may be operative to receive input from prediction module 207 and generate natural language text based on the received input from prediction vector. Text generation module 209 can create sentences based on the natural language generation module 208 output Each of the operations of modules 203-209 of multidimensional inferential system 200 are discussed in more detail with reference to FIG. 3.

Figure 3:
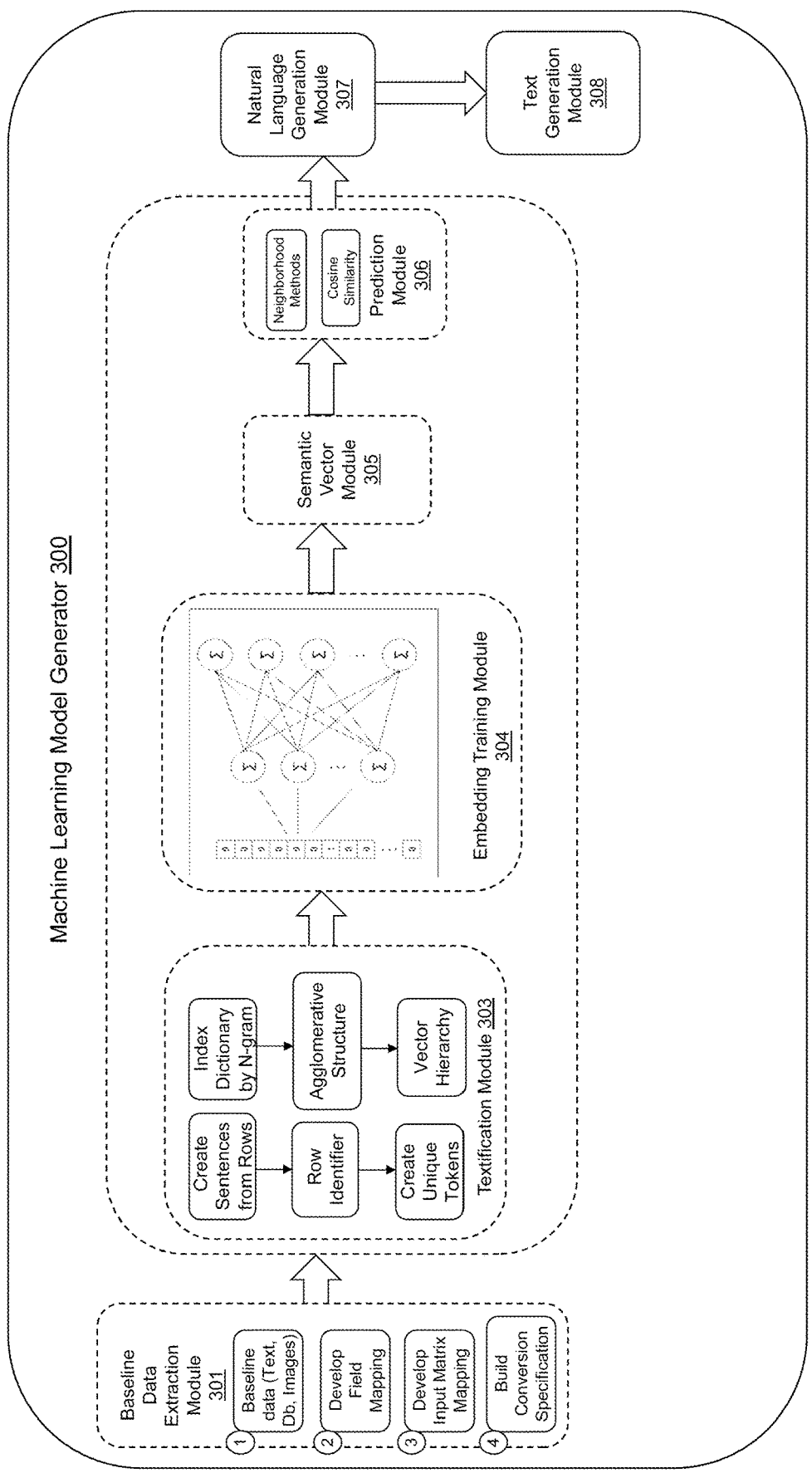
FIG. 3 is a flow diagram illustrating a process of processing baseline data represented as a multidimensional table and generating inferential text using machine learning techniques, consistent with an illustrative embodiment.

FIG. 3 is a flow diagram illustrating a process of training a machine learning model including using, at least, agglomerative clustering and a neural network. Machine learning model generator 300 includes baseline data extraction module 301, textification module 303, embedding training module 304, semantic vector module 305, prediction module 306, natural language generation module 307, and text generation module 308, which may be similar to modules 203-208.

Baseline data extraction module may clean the multidimensional table (e.g., training data), e.g., by removing duplicate data, such as redundant rows and/or columns, and may map fields of the multidimensional table included in the baseline data or training data. In some examples, the multidimensional table is mapped using vector embeddings. In some examples, baseline data extraction module 301 converts the multidimensional table to a table having properties substantially similar to, or the same as, SQL, and SQL queries can also be used for extraction and embedding purposes as vector embeddings. Baseline data extraction module 301 may develop field mapping and input matrix mapping of the multidimensional table. Further, baseline data extraction module 301 may build a conversion specification.

Figure 6:
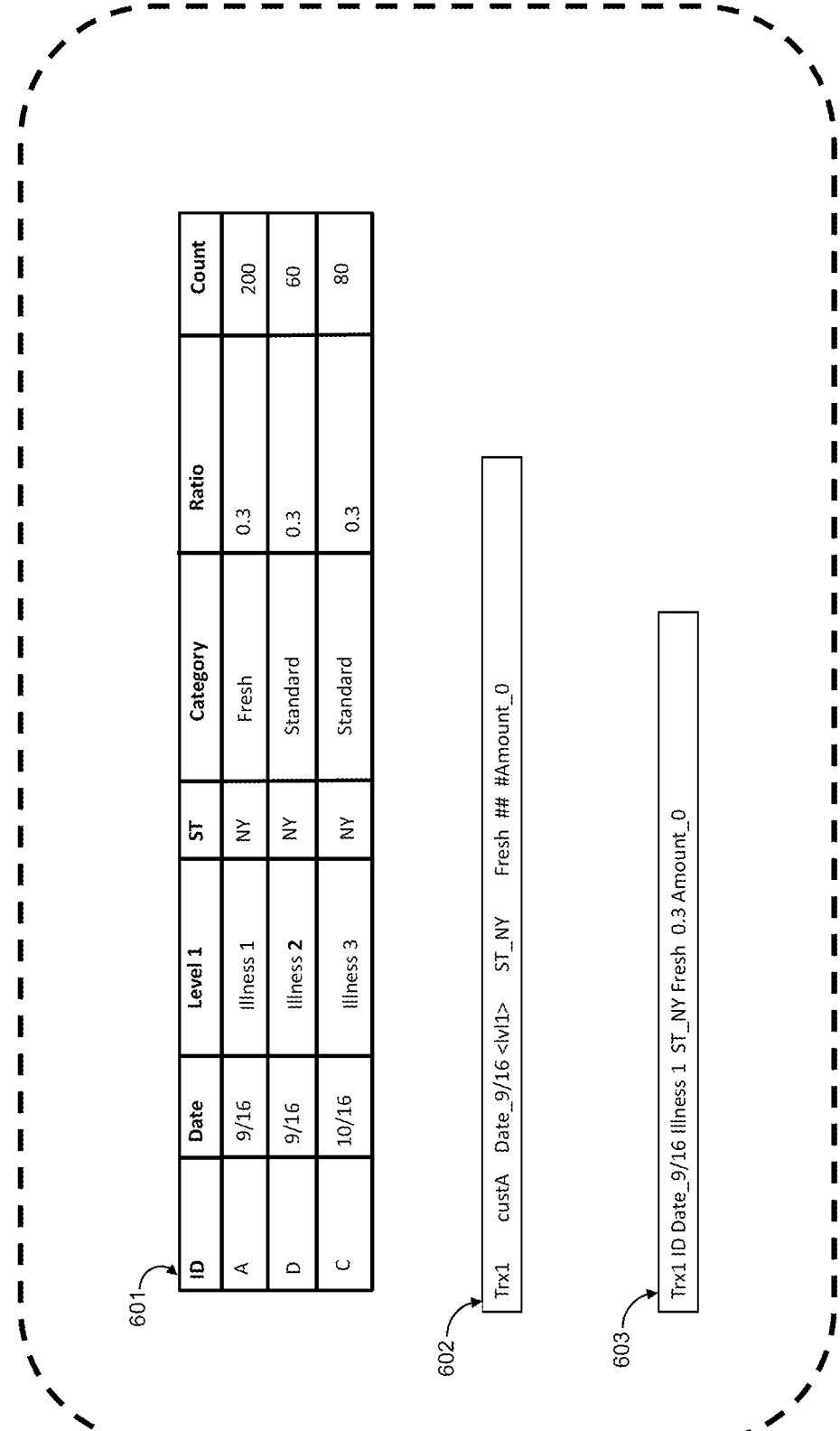
FIG. 6 is a block diagram illustrating an example baseline data represented as a table, consistent with an illustrative embodiment.

Textification module 303 of natural language processing generation module 302 may generate a unique token for each row of the multidimensional table. For example, textification module 303 may convert each row of the multidimensional table into a structure of a full sentence. For example, as discussed in more detail with reference to FIG. 6, each row of the multidimensional table may include properties of each row of the multidimensional table in a particular sequence. For example, as shown in FIG. 6, for row "A" of table 601, a sequence of properties may be established, including a date, state of origin, category, ratio, and the like. Further, textification module 303 may generate a row identifier (e.g., 'Trx1') for each row and then assign a unique token 602.

Further, textification module 303 may generate an N-gram index dictionary for quick storage and retrieval of the assigned unique tokens. Textification module 303 may generate an agglomerative structure (e.g., as shown in FIGS. 5A and 5B) based in part on the assigned unique tokens and properties of each row of the multidimensional table. Textification module 303 may generate a vector hierarchy based in part on the generated agglomerative structure.

In some examples, textification module 303 may map each table, including each assigned row identifier, associated unique tokens, and hierarchical structure using an agglomerative clustering method. This may establish a hierarchical graph (as shown in FIG. 5B) having different rows linked to each other in a parent-child relationship. The hierarchical clustering creates the rows with each identification of node that can be traced back. For example, as discussed in FIG. 5B, a parent-child relationship may be formed. A parent-child relationship relies on the identification who is the parent of any node and who are its child nodes. Having an agglomerative clustering model allows the computing system to build the parent-child tree structure (e.g., hierarchical divisive clustering model 510). The hierarchical graph may be illustrated in FIGS. 5A and 5B using table 400 from FIG. 4 as an example.

FIGS. 4, 5, and 6 are discussed together to explain the textification process and more specifically, the agglomerative structuring process implemented by textification module 303.

FIG. 4 is a diagram illustrating an example table 400 that includes baseline data in the form of a multidimensional table. In some examples, table 400 may be structured or unstructured and may be of any dimensions, including one dimension, two dimensions, three dimensions, and so on. In some examples, table 400 may be transmitted over network 106, from a user device 102(1)-102(N) to server, and in the form of an electronic data package 105(1)-105(N). In examples, baseline data included in table 400 may be experimental data, clinical data, tax audit data, and so on, and may be represented in the form of quantitative data and/or qualitative data. For brevity, only clinical study data generally representing illness types is illustrated within table 400, however, any time of baseline data may be included within a multidimensional table.

In examples, table 400 includes four columns and four rows and may be a relational table. The first row includes categories of baseline data, including primary outcome (such as an illness based on a set of symptoms which are not shown), standard with a population size of 189, fresh with a population size of 188, and a risk ratio. The second row lists a first illness (illness 1) in the first column, a standard population size of 63 and associated percentage of total 33.3%, a fresh population size of 60 and associated percentage total of 31.9%, and a risk ratio of 0.96. The third row lists a second illness (illness 2) in the first column, a standard population size of 31 and associated percentage of total of 16.4%, a fresh population size of 30 and associated percentage total of 16.0%, and a risk ratio of 0.97. The fourth row lists a composite primary in the first column, a standard population size of 100 and associated percentage of total of 52.9%, a fresh population size of 99 and associated percentage total of 52.7%, and a risk ratio of 1.00.

With reference to FIGS. 5A and 5B, FIG. 5A is a diagram illustrating a pyramid embedding model 500 of a relational table (e.g., table 400) and FIG. 5B is an exemplary diagram illustrating a hierarchical divisive clustering model. Each row of pyramid embedding model lists a different row of table 400. For example, the primary outcome 501 is positioned at the top of pyramid embedding model 500; illness 1 standard and illness 1 fresh are positioned one level down from the top at positions 502 and 503, respectively; illness 2 standard and illness 2 fresh are positioned one level down from the top at positions 504 and 505, respectively; and illness 3 standard and illness 3 fresh are positioned one level down from the top at positions 506 and 507, respectively. Illness 3 is not included in table 400 but is illustrated in FIG. 5 for purposes of illustration. Each row of pyramid embedding model is a different hierarchical row, and each row is stacked in relation to their contextual importance. For example, illness 1 may be considered the most important illness relative to illnesses 2 and 3; illness 2 may be considered the second most important relative to illnesses 1 and 3; and illness 3 may be considered the third most important relative to illnesses 1 and 2.

Pyramid embedding model 500 may have two levels of relationships captured: one is vertical and another is horizontal. An aggregate identification is assigned to each block of vertical rows to capture the relationship between various blocks of the multidimensional table 400. The words extracted from the baseline data may be represented as leaf units of a graph tree. It can be proven that there are V−1 inner leaf units of hierarchical divisive clustering model 510. For each leaf unit, there exists a unique path from the root to the leaf unit; and this path is used to estimate the probability of the word represented by the leaf unit.

FIG. 5B is a diagram illustrating a hierarchical divisive clustering model 510 that implements a top-down approach. Hierarchical divisive clustering model 510 has many child-parent relationships. For example, child nodes 518 and 519 have parent node 515, which is also a child node, along with child node 514, to parent node 512. Chile nodes 520 and 521 have parent node 516, which is a child node, along with child node 517, to parent node 513. And child nodes 512 and 513 have parent node 511. Each of the parent and child nodes may be denoted as leaf units of hierarchical divisive clustering model 510.

Parent node 511 may include a general population, for example, a population of subjects that include illnesses 1 and 2. Child node 512 may include subjects from the population that have illness 1 and child node 513 may include subjects from the population that have illness 2. Child node 512 may be a parent node to, and further divided to include, child nodes 514 and 515 based on standard and fresh. For example, child node 514 may include subjects with illness 1 that have standard red blood cells and child node 515 may include subjects with illness 1 that have fresh red blood cells. Similarly, child node 513 may be a parent node to, and further divided to include, child nodes 516 and 517 based on standard and fresh. For example, child node 516 may include subjects with illness 2 that have standard red blood cells and child node 517 may include subjects with illness 2 that have fresh red blood cells. Child nodes 515 and 516 may be further divided based on specific attributes.

FIG. 6 is an exemplary table that is used to illustrate the tokenization process of a multidimensional table, as implemented by textification module 303. With reference to FIG. 6, multidimensional table 601 is a two-dimensional table, however, multidimensional table may have any number of dimensions, including one dimension, two dimensions, ten dimensions, and so on. Each multidimensional table can be categorized as a hierarchical structure and converted by textification module 303 using an agglomerative clustering method to find a key node for each multidimensional table and each subsequent row. While the vertical relationship is captured (as was described with reference to FIGS. 4 and 5A-B), textification module 303 can now capture the context of each row (which may be represented as a unique token 602 represented in the form of a vector) of multidimensional table 601 (which may be a variant of table 400, with additional categories including ID, Date, Level 1, and so on. Unique token 602, "Trx1" is a row identifier. Instead of using a standard word to vector (i.e., word2vec) algorithm, textification module 303 can apply database embedding that treats each database row as a sentence, and capture the context of the neighbors (e.g., neighbor rows "A," "D," and "C"). Each entity in the unique token 602 represented as a vector is the collective contribution of the neighborhood. Token 603 is a variation of unique token 603 represented in a different form. In some examples, either token 602 or token 603, or another token similar to tokens 602, 603 may be used herein.

Returning to FIG. 3, embedding training module 304 may receive the generated unique tokes as input, along with context between each of the rows of the multidimensional table. Embedding training module 304 may input received tokens to a neural network, e.g., a 3-layer neural network (e.g., neural network 700), to learn relationships between each of the rows of the multidimensional table. With reference to FIG. 7, 3-layer neural network 700 may include an input layer 701, at least one hidden layer 703, and an output layer 705. In some examples, the 3-layer neural network may include at least two hidden layers. For example, 3-layer neural network 700 may have two, three, or as many hidden layers as necessary. The learned vectors then can be used using a similarity function for either prediction or passing it to a natural language generation (NLG) architecture like long, short-term memory (LSTM), a transformer, GPT3, and the like. In examples, unique tokens 602 may be input to input layer 701, and then processed using weighted functions, at hidden layer 703, as discussed below that are generated according to training data. Output layer 705 may output a prediction of a vector according to the training data. The predicted vector may be compared to the target vector. For example, the predicted vector may be compared to what a, e.g., clinician desires the predicted output to be.

In some examples, the 3-layer neural network may act as a multi-modal model to generate N-gram outputs of learned vectors. For example, 3-layer neural network 700 may be trained using raw data as well as SQL queries attached to the raw data to generate an equivalent output. An SQL query by itself captures the context of the relationship of the raw data, such as rows of a multidimensional table, much more efficiently.

In some examples, output layer 705 may be a hierarchical SoftMax function for calculating a probability of a correct output from output layer 705, for example, to compute a probability of a particular letter, "w," being an output letter from output layer 705. The probability of "w" being the output letter may be defined as the probability of a random walk starting from the root ending at the leaf unit in question. At each inner unit (including the root unit), we need to assign the probabilities of going left and going right. We define the probability, p, of going left at an inner unit n to be as provided by the expression below:

$$p(n,\text{left}) = \sigma(v\_n^T h) \tag{Eq. 1}$$

The probability of equation 1 hereinabove is determined by both the vector representation of the inner unit, and the output value of the hidden layer 703, that may be determined by a vector representation of the input letter at the input layer 701. In examples, the probability of going right at unit n is making the hierarchical SoftMax function a well-defined multinomial distribution among all words.

Semantic vector module 305 may receive each output from embedding training module 304 and generate a semantic vector (which is a learned representation of the output vector from output layer 705) for each output. Prediction module 306 includes a neighboring methods module and a cosine similarity module. Prediction module 306 may execute both neighboring method module and cosine similarity module to determine relationships between each of the semantic vectors generated by semantic vector module 305. In some examples, prediction module 306 may score (e.g., a numerical representation indicating accuracy of a semantic vector) a model that generates text. For example, the prediction module 306 will score the model that is applied to the output of semantic vector 305.

Natural language generation module 307 receives input from prediction module 306 and generates natural language for each multidimensional table represented as a pyramid function. Text generation module 308 generates text which may result in one or more paragraphs to create a summary of the multidimensional table. An optional feedback loop may be incorporated in order to improve the accuracy of the generated text. For example, the optional feedback loop may compare the generated text or sentences to historically generated text and/or sentences. In some examples, the optional feedback may incorporate user feedback, e.g., by receiving user input that includes whether the user finds generated text useful or not. Alternatively, or additionally, natural language generation module 207 uses a recurrent neural network based semi-supervised model or a sequence model like LSTM can also be used to generate the natural language based on the vectorization technique.

Figure 8:
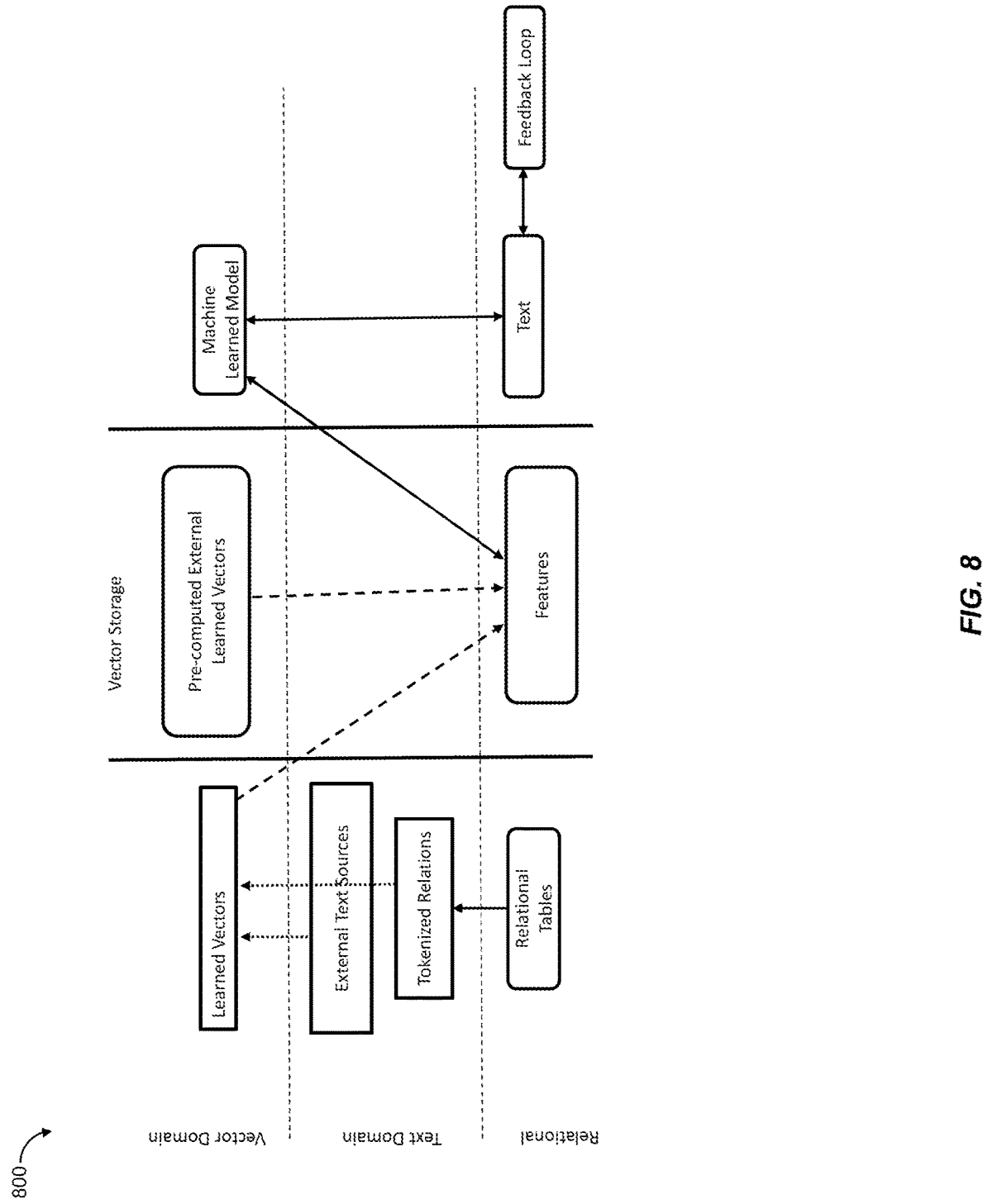
FIG. 8 is a flow diagram illustrating an example process for generating text based on relational tables and incorporates a feedback loop, consistent with an illustrative embodiment.

FIG. 8. illustrates a flow diagram illustrating a process of using machine learning techniques to generate natural language text. Diagram 800 may be separated into three segments: relational domain, text domain, and vector domain. For example, diagram 800 may begin, in the relational domain, with relational tables (e.g., baseline data represented in the form of multidimensional tables). Diagram 800 may continue with generating tokenized relations (e.g., as discussed above with reference to FIGS. 3-6), within the text domain, based on the relational tables. Diagram 800 may continue with generating learned vectors (e.g., unique token 602 represented as a vector) based in part on external text sources (e.g., training data 113) and the tokenized relations.

Diagram 800 may continue in the relational domain and a vector storage domain with generating features based in part on the learned vectors, pre-computed external learned vectors, and the machine learned model. Features may be received from, and transmitted to, the generative model, that may output inferential natural language text such as in a final publication. In some examples, feedback loop may be incorporated in text generation to increase accuracy of the final publication by receiving user feedback as to whether the final publication is in fact correct.

Figure 9:
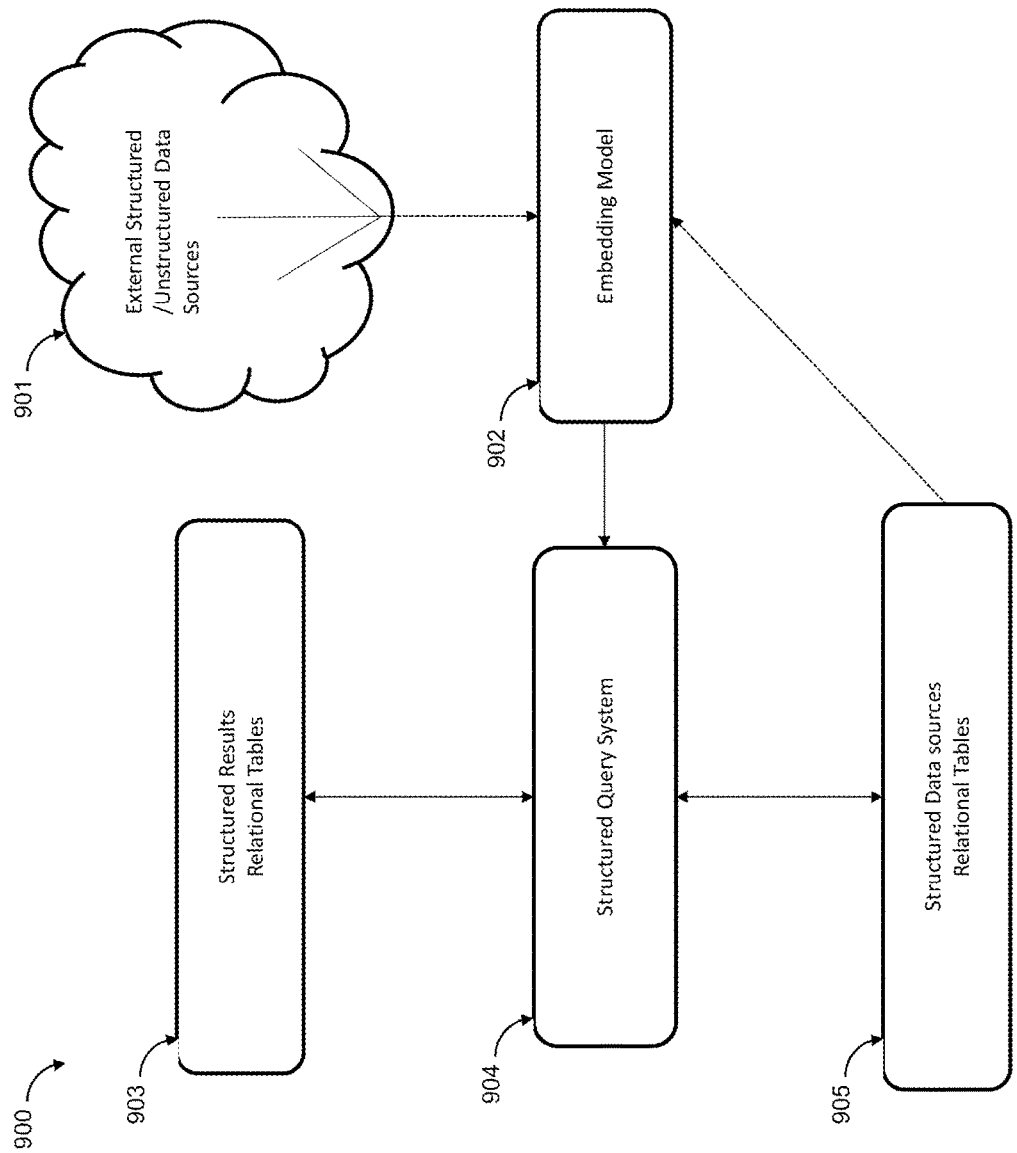
FIG. 9 is a flowchart illustrating a method for generating text based on processing external structured and unstructured data sources, consistent with an illustrative embodiment.

FIG. 9 illustrates an exemplary flow diagram of a process for generating an embedding model. Diagram 900 may begin with embedding model 902 (e.g., embedding training model 304) receiving from, e.g., an external computing source (such as computing devices 102(1)-(N)) structured and unstructured data sources 901 (e.g., baseline data in the form of external data packages 105(1)-(N)). Embedding model 902 may be a pre-trained model, e.g., using training data 113. In some examples, embedding model 902 may be incrementally trained, which may be periodically (e.g., every hour, day, week, and the like) or upon a trigger event (such as a user request and/or execution of multidimensional inferential system 103). In examples, embedding model 902 may be a model invoked by textification modules 203, 303, as discussed above with reference to FIGS. 2-6. For example, embedding model 902 may be trained to perform agglomerative clustering (as discussed with reference to FIGS. 2-6) on multidimensional tables (e.g., tables 400, 601) which may be relational tables.

Embedding model 902 may further transmit the embedded multidimensional tables to a structured query system 904. Structures query system 904 may structure the embedded tables according to an SQL system, where the embedded data within table can be created, maintained, and retrieved. Structured query systems 904 may receive structured results of relational tables (e.g., tables 400, 601) to/from block 905 and transmit data to/from block 903, where block 903 has structured results and relational tables. Structured query systems 904 may transmit to, and receive from, structured data sources of relational tables from block 905. In some examples, embedding model 902 may be created from data sources within structured data sources 905 of relational tables being queried.

Figure 10:
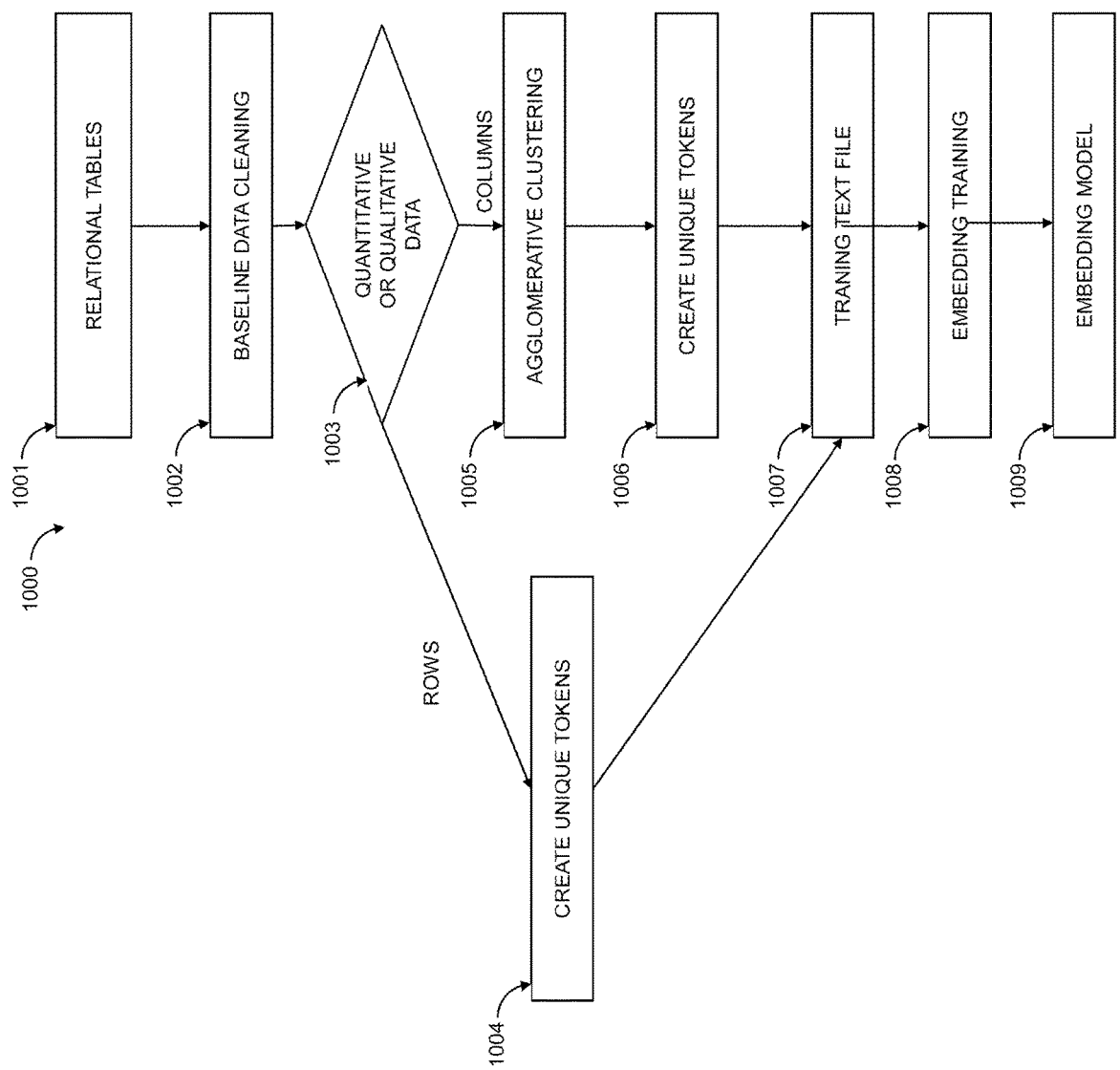
FIG. 10 is a flowchart illustrating a method for creating unique tokens to be used for training an embedding model, consistent with an illustrative embodiment.

FIG. 10 is a flowchart illustrating a method of generating a machine learning model. In some examples, the unique tokens may be used to train the embedding model 902 of FIG. 9. Method 1000 may include generating (1001) relational tables. In one example of block 1001, relational tables may be generated from baseline data, such as baseline data from, e.g., a clinical trial, scientific experiment, tax or business audit, and so on, represented in the form of a multidimensional table. Method 1000 may further include cleaning (1002) baseline data. In one example of block 1002, baseline data extraction module 301 cleans the baseline data. In one example of block 1002, baseline data extraction module 301 receives baseline data (e.g., electronic data packages 105(1)-(N)) and removes redundant data (e.g., duplicative rows of the multidimensional table).

Method 1000 may further include determining (1003) whether the baseline data is row or a column or a header or data supporting the header. For example, the header or column may include a first row of a multidimensional table, such as categories. For example, with reference to table 601 of FIG. 6, the columns may include ID, Date, ST, Category, Ratio, Count, Illness 1, Fresh, and the like. Continuing reference to tables 400, 601, rows may include the ratio value, 0.3, and/or count 200 and 60. Method 1000 may proceed to block 1004, where unique tokens (e.g., tokens 602, 603) are created. In one example of block 1004, any computer program language (such as Python) is used to create the unique tokens.

However, columns or headers of the relational table may proceed to block 1005, where agglomerative clustering is performed. In one example of block 1005, textification module 303 performs agglomerative clustering to determine relationships between categories. Method 1000 further includes creating (1006) unique tokens on the clustered data. In one example of block 1006, textification module 303 creates the unique tokens, as discussed with reference to FIGS. 2-6. Method 1000 further includes training (1007) a text file based in part on the created unique tokens from blocks 1004, 1006. In one example of block 1007, embedding training module 304 trains the text files, as discussed above with reference to at least FIGS. 2-7. Method 1000 further includes performing (1008) embedding training. In one example of block 1008, embedding training module 304 performs the embedding training, as discussed above with reference to at least FIGS. 2-7. Method 1000 further includes finalizing (1009) an embedding model. In one example of block 1009, embedding model is the output from the embedding training at block 1008.

Figure 11:
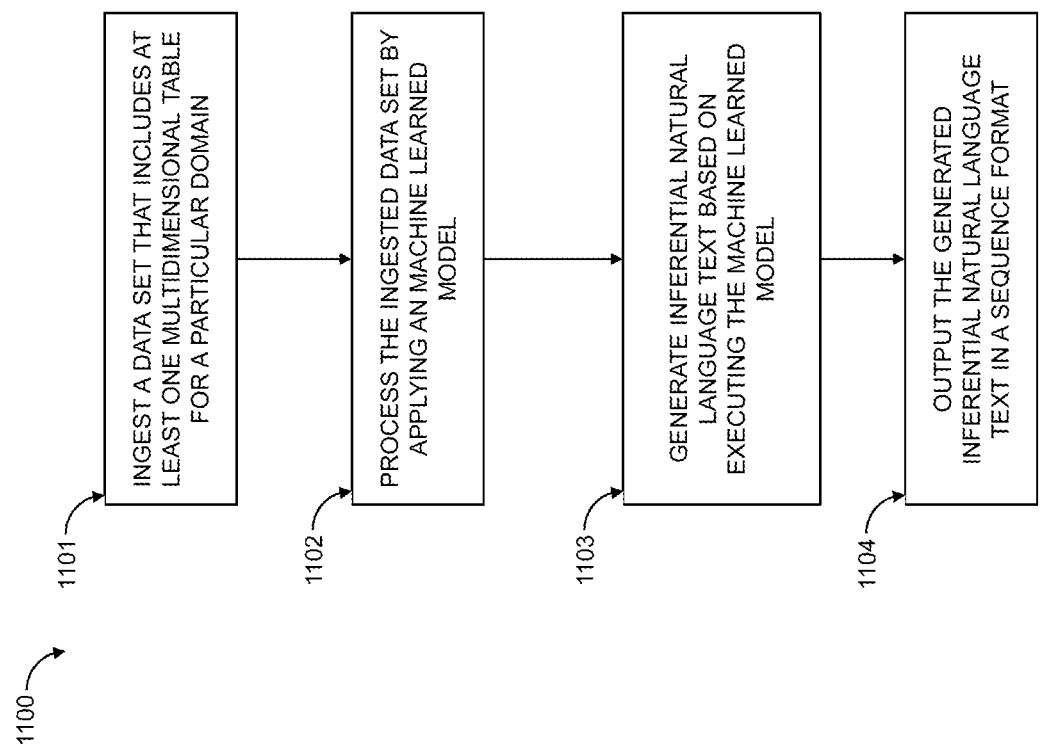
FIG. 11 is a flowchart illustrating a method for generating a final publication based on baseline data using machine learning techniques, consistent with an illustrative embodiment.

FIG. 11 is a flowchart illustrating a process of receiving baseline data in the form of a multidimensional table and generating, e.g., a publication, such as a clinical trial report, that accurately summarizes the multidimensional table. Method 1100 includes ingesting (1101) a data set that includes at least one multidimensional table for a particular domain. In one example of block 1101, multidimensional inferential system 103 receives at least one electronic data package 105(1)-(N) (e.g., a multidimensional table 400, 601 including baseline data).

Method 1100 further includes processing (1102) the ingested data set by applying a machine learning model to the multidimensional table. The machine learning model is generated by machine learning model generator 202, 300 and is discussed in more detail with reference to FIGS. 3-10. In one example of block 1102, machine learning model applier 210 applies a machine learning model generated by machine learning model generator 202.

Method 1100 further includes generating (1103) inferential natural language text based on applying the machine learning model. In one example of block 1103, publication generator 211 generates inferential text that, e.g., summarizes the baseline data listed in the multidimensional table. In one example of block 1103 the text is in the form of sentences that are ordered and/or structured according to a predetermined criteria (such as is required by CONSORT).

Method 1100 further includes outputting (1104) the generated inferential natural language text. In one example of block 1104, the text is transmitted over a network (e.g., network 106) by multidimensional inferential system 103 for display within graphical user interface (e.g., within a display of one of electronic devices 102(1)-(N)).

Figure 12:
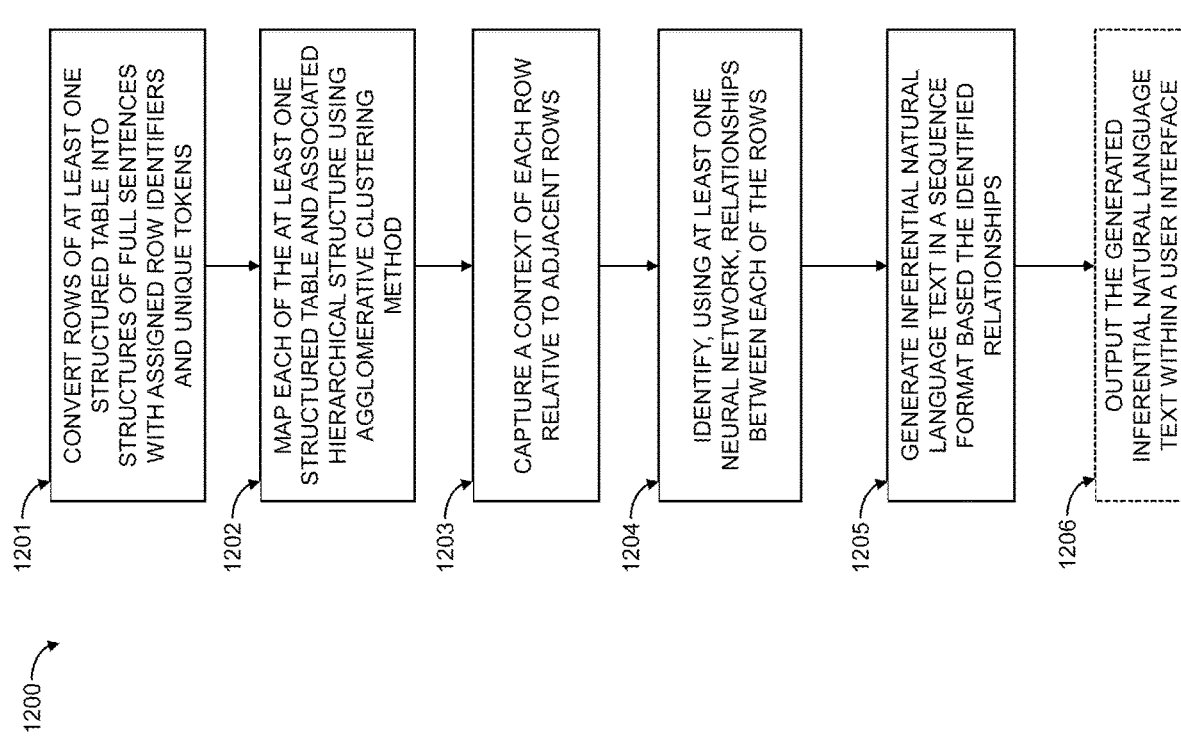
FIG. 12 is a flowchart illustrating a method of processing a multidimensional table using, in part, agglomerative clustering techniques, consistent with an illustrative embodiment.

FIG. 12 is a flowchart illustrating a method for generating a machine learning model to apply to a multidimensional table for generating inferential text (e.g., in the form of a publication). Method 1200 includes a multidimensional inferential system (e.g., multidimensional inferential system 103) converting (1201) a plurality of rows of at least one structured table (e.g., table 400, 601) into structures of full sentences with assigned rows and unique tokens. Multidimensional inferential system maps (1202) each of the at least one structured table and associated hierarchical structure using an agglomerative clustering technique. Multidimensional inferential system captures (1203) a context of each row relative to adjacent rows. Multidimensional inferential system identifies (1204) relationships between each of the rows using at least one neural network (e.g., a 3-layer neural network and/or neural network having a SoftMax function). Multidimensional inferential system generates (1205) inferential natural language test in a sequence format based on the identified relationships. Multidimensional inferential system outputs (1206) the generated inferential natural language text.

In one example of block 1102, textification module 303 creates unique tokes corresponding to rows of the multidimensional table and creates a vector hierarchy using an agglomerative structure. In one example of block 1102, processing includes executing an embedding training module 304, a semantic vector module 305, and a prediction module 306 to identify relationships between unique tokens and rows of the multidimensional table.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 13:
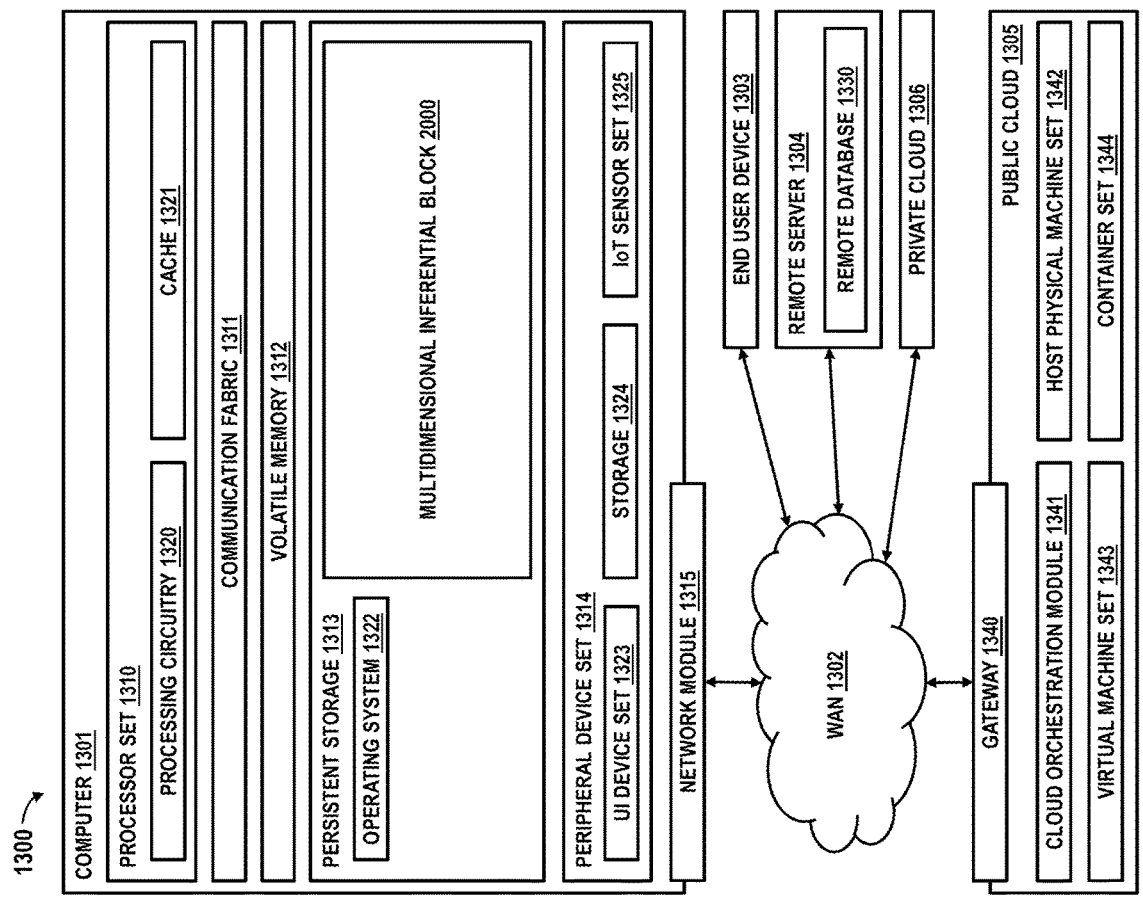
FIG. 13 is a block diagram illustrating an example computing environment, consistent with an illustrative embodiment.

Computing environment 1300 of FIG. 13 contains an example of an environment for the execution of at least some of the computer code involved in performing the inventive methods, such as multidimensional inferential code 2000 that includes instructions that, when executed, cause processing circuitry 1320 to generate inferential text based on processing, using at least an agglomerative clustering technique and neural network(s), baseline data (as discussed with reference to FIGS. 1-12). In addition to block 2000, computing environment 1300 includes, for example, computer 1301, wide area network (WAN) 1302, end user device (EUD) 1303, remote server 1304, public cloud 1305, and private cloud 1306. In this embodiment, computer 1301 includes processor set 1310 (including processing circuitry 1320 and cache 1321), communication fabric 1311, volatile memory 1312, persistent storage 1313 (including operating system 1322 and block 2000, as identified above), peripheral device set 1314 (including user interface (UI) device set 1323, storage 1324, and Internet of Things (IOT) sensor set 1325), and network module 1315. Remote server 1304 includes remote database 1330. Public cloud 1305 includes gateway 1340, cloud orchestration module 1341, host physical machine set 1342, virtual machine set 1343, and container set 1344.

Computer 1301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1330. As is well understood in the art of computer technology, and depending upon the technology, performance of a computer-implemented method may be distributed among multiple computers and/or between multiple locations. On the other hand, in this presentation of computing environment 1300, detailed discussion is focused on a single computer, specifically computer 1301, to keep the presentation as simple as possible. Computer 1301 may be located in a cloud, even though it is not shown in a cloud in FIG. 13. On the other hand, computer 1301 is not required to be in a cloud except to any extent as may be affirmatively indicated.

Processor set 1310 includes one, or more, computer processors of any type now known or to be developed in the future. Processing circuitry 1320 may be distributed over multiple packages, for example, multiple, coordinated integrated circuit chips. Processing circuitry 1320 may implement multiple processor threads and/or multiple processor cores. Cache 1321 is memory that is located in the processor chip package(s) and is typically used for data or code that should be available for rapid access by the threads or cores running on processor set 1310. Cache memories are typically organized into multiple levels depending upon relative proximity to the processing circuitry. Alternatively, some, or all, of the cache for the processor set may be located "off chip." In some computing environments, processor set 1310 may be designed for working with qubits and performing quantum computing.

Computer readable program instructions are typically loaded onto computer 1301 to cause a series of operational steps to be performed by processor set 1310 of computer 1301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1321 and the other storage media discussed below. The program instructions, and associated data, are accessed by processor set 1310 to control and direct performance of the inventive methods. In computing environment 1300, at least some of the instructions for performing the inventive methods may be stored in block 2000 in persistent storage 1313.

Communication fabric 1311 is the signal conduction path that allows the various components of computer 1301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1312 is any type of volatile memory now known or to be developed in the future. Examples include dynamic type random access memory (RAM) or static type RAM. Typically, volatile memory 1312 is characterized by random access, but this is not required unless affirmatively indicated. In computer 1301, the volatile memory 1312 is located in a single package and is internal to computer 1301, but, alternatively or additionally, the volatile memory may be distributed over multiple packages and/or located externally with respect to computer 1301.

Persistent storage 1313 is any form of non-volatile storage for computers that is now known or to be developed in the future. The non-volatility of this storage means that the stored data is maintained regardless of whether power is being supplied to computer 1301 and/or directly to persistent storage 1313. Persistent storage 1313 may be a read only memory (ROM), but typically at least a portion of the persistent storage allows writing of data, deletion of data and re-writing of data. Some familiar forms of persistent storage include magnetic disks and solid-state storage devices. Operating system 1322 may take several forms, such as various known proprietary operating systems or open-source Portable Operating System Interface-type operating systems that employ a kernel. The code included in block 2000 typically includes at least some of the computer code involved in performing the inventive methods.

Peripheral device set 1314 includes the set of peripheral devices of computer 1301. Data communication connections between the peripheral devices and the other components of computer 1301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1323 may include components such as a display screen, speaker, microphone, wearable devices (such as goggles and smart watches), keyboard, mouse, printer, touchpad, game controllers, and haptic devices. Storage 1324 is external storage, such as an external hard drive, or insertable storage, such as an SD card. Storage 1324 may be persistent and/or volatile. In some embodiments, storage 1324 may take the form of a quantum computing storage device for storing data in the form of qubits. In embodiments where computer 1301 is required to have a large amount of storage (for example, where computer 1301 locally stores and manages a large database) then this storage may be provided by peripheral storage devices designed for storing very large amounts of data, such as a storage area network (SAN) that is shared by multiple, geographically distributed computers. IoT sensor set 1325 is made up of sensors that can be used in Internet of Things applications. For example, one sensor may be a thermometer and another sensor may be a motion detector.

Network module 1315 is the collection of computer software, hardware, and firmware that allows computer 1301 to communicate with other computers through WAN 1302. Network module 1315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1315 are performed on the same physical hardware device. In other embodiments (for example, embodiments that utilize software-defined networking (SDN)), the control functions and the forwarding functions of network module 1315 are performed on physically separate devices, such that the control functions manage several different network hardware devices. Computer readable program instructions for performing the inventive methods can typically be downloaded to computer 1301 from an external computer or external storage device through a network adapter card or network interface included in network module 1315.

Wireless area network (WAN) 1302 is any wide area network (for example, the internet) capable of communicating computer data over non-local distances by any technology for communicating computer data, now known or to be developed in the future. In some embodiments, the WAN 1302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1303 is any computer system that is used and controlled by an end user (for example, a customer of an enterprise that operates computer 1301), and may take any of the forms discussed above in connection with computer 1301. EUD 1303 typically receives helpful and useful data from the operations of computer 101. For example, in a hypothetical case where computer 1301 is designed to provide a recommendation to an end user, this recommendation would typically be communicated from network module 1315 of computer 1301 through WAN 102 to EUD 1303. In this way, EUD 1303 can display, or otherwise present, the recommendation to an end user. In some embodiments, EUD 1303 may be a client device, such as thin client, heavy client, mainframe computer, desktop computer and so on.

Remote server 1304 is any computer system that serves at least some data and/or functionality to computer 1301. Remote server 1304 may be controlled and used by the same entity that operates computer 1301. Remote server 1304 represents the machine(s) that collect and store helpful and useful data for use by other computers, such as computer 1301. For example, in a hypothetical case where computer 1301 is designed and programmed to provide a recommendation based on historical data, then this historical data may be provided to computer 1301 from remote database 1330 of remote server 1304.

Public cloud 1305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 1341. The computing resources provided by public cloud 1305 are typically implemented by virtual computing environments that run on various computers making up the computers of host physical machine set 1342, which is the universe of physical computers in and/or available to public cloud 1305. The virtual computing environments (VCEs) typically take the form of virtual machines from virtual machine set 1343 and/or containers from container set 1344. It is understood that these VCEs may be stored as images and may be transferred among and between the various physical machine hosts, either as images or after instantiation of the VCE. Cloud orchestration module 1341 manages the transfer and storage of images, deploys new instantiations of VCEs and manages active instantiations of VCE deployments. Gateway 1340 is the collection of computer software, hardware, and firmware that allows public cloud 1305 to communicate through WAN 1302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1306 is similar to public cloud 1305, except that the computing resources are only available for use by a single enterprise. While private cloud 1306 is depicted as being in communication with WAN 1302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1305 and private cloud 1306 are both part of a larger hybrid cloud.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method, comprising:
ingesting, by a computing system, a data set that includes at least one structured hierarchical or multidimensional table for a particular domain;
processing, by the computing system, the ingested data set that includes the at least one structured hierarchical or multidimensional table for the particular domain by applying a generated machine learning model;
generating, by the computing system, inferential natural language text based on applying the machine learning model;
assigning, by the computing system, a row identifier and a unique token for each row of the at least one structured hierarchical or multidimensional table;
converting, by the computing system, each row of the at least one structured hierarchical or multidimensional table into a sentence with the assigned row identifier and unique token;
mapping, by the computing system, using agglomerative clustering techniques, the at least one structured hierarchical or multidimensional table and an associated hierarchical structure;
determining, by the computing system, based on mapping the at least one structured hierarchical or multidimensional table and the associated hierarchical structure, context for each row of the at least one structured hierarchical or multidimensional table;
determining, based on the determined context for each row of the at least one table, a relationship between each row of the at least one structured hierarchical or multidimensional table; and
outputting, by the computing system, the generated inferential natural language text in a sequence format.

2. The method of claim 1, wherein the at least one structured hierarchical or multidimensional table is a multidimensional clustering table.

3. The method of claim 1, wherein determining the relationship between each row further comprises using, by the computing system, a recurrent neural network based on semi-supervised model or a sequence model.

4. The method of claim 1, wherein determining the relationship between each row further comprises using, by the computing system, a deep neural network natural language generation model as a pyramid function.

5. The method of claim 1, the method further comprising inputting, by the computing system, the generated inferential text to a feedback loop configured to compare the generated inferential text to historically generated inferential text.

6. The method of claim 1, wherein:
determining a relationship between each row further comprises inputting each unique token to a neural network;
the neural network comprises an input layer, at least one hidden layer, and an output layer; and
the output layer is a SoftMax function.

7. A computing system comprising:
a processor;
a storage device coupled to the processor;
program instructions stored in the storage device, wherein an execution of the instructions by the processor configures the processor to perform acts comprising:
ingesting, by the processor, a data set that includes at least one structured hierarchical or multidimensional table for a particular domain;
processing the ingested data set that includes the at least one structured hierarchical or multidimensional table for the particular domain by applying a generated machine learning model;
generating inferential natural language text based on applying the machine learning model;
assigning a row identifier and unique token for each row of the at least one structured hierarchical or multidimensional table;
converting for each row of the at least one structured hierarchical or multidimensional table into a sentence with the assigned row identifier and unique token;
mapping, using agglomerative clustering techniques, the at least one hierarchical or multidimensional structured table and an associated hierarchical structure;
determining based on mapping the at least one structured hierarchical or multidimensional table and the associated hierarchical structure, context for each row of the at least one structured hierarchical or multidimensional table; and
determining, based on the determined context for each row of the at least one structured table, a relationship between each row of the at least one structured table; and
outputting the generated inferential natural language text in a sequence format.

8. The computer system of claim 7, wherein the determining the relationship between each row further comprises using a recurrent neural network based on semi-supervised model or a sequence model.

9. The computer system of claim 7, wherein the determining the relationship between each row further comprises using, by the computing system, a deep neural network natural language generation model as a pyramid function.

10. The computer system of claim 7, wherein the execution of the instructions by the processor further configures the processor to perform an act comprising inputting the generated inferential text to a feedback loop configured to compare the generated inferential text to historically generated inferential text.

11. The computer system of claim 7, wherein
determining a relationship between each row further comprises inputting each unique token to a neural network;
the neural network comprises an input layer, at least one hidden layer, and an output layer; and
the output layer is a SoftMax function.

12. The computer system of claim 7, wherein the at least one structured hierarchical or multidimensional table is a multidimensional clustering table.

13. A computer program product comprising:
one or more non-transitory computer-readable storage devices and program instructions stored on at least one of the one or more non-transitory storage devices, the program instructions executable by a processor, the program instructions comprising instructions to:
ingest, by the processor, a data set that includes at least one structured hierarchical or multidimensional table for a particular domain;
process the ingested data set that includes the at least one structured hierarchical or multidimensional table for the particular domain by applying a generated machine learning model;
generate an inferential natural language text based on applying the machine learning model;

assigning a row identifier and unique token for each row of the at least one structured hierarchical or multidimensional table;

converting each row of the at least one structured hierarchical or multidimensional table into a sentence with the assigned row identifier and unique token;

mapping, using at least one agglomerative clustering technique, the at least one structured hierarchical or multidimensional table and an associated hierarchical structure;

determining based on a mapping of the at least one structured hierarchical or multidimensional table and the associated hierarchical structure, context for each row of the at least one structured hierarchical or multidimensional table;

determining, based on the determined context for each row of the at least one structured table, a relationship between each row of the at least one structured table; and output the generated inferential natural language text in a sequence format.

14. The computer program product of claim 13, wherein the determining the relationship between each row further comprises using a recurrent neural network based on semi-supervised model or a sequence model.

15. The computer program product of claim 13, wherein determining the relationship between each row further comprises using, by the computing system, a deep neural network natural language generation model as a pyramid function.

16. The computer program product of claim 13, the program instructions comprising instructions to input, by the computing system, the generated inferential text to a feedback loop configured to compare the generated inferential text to historically generated inferential text.

17. The computer program product of claim 13, wherein the at least one structured hierarchical or multidimensional table is a multidimensional clustering table.

* * * * *